United States Patent
Woods et al.

(10) Patent No.: US 7,627,040 B2
(45) Date of Patent: Dec. 1, 2009

(54) METHOD FOR PROCESSING I-BLOCKS USED WITH MOTION COMPENSATED TEMPORAL FILTERING

(75) Inventors: John W. Woods, Clifton Park, NY (US); Peisong Chen, San Diego, CA (US); Yongjun Wu, San Jose, CA (US)

(73) Assignee: Rensselaer Polytechnic Institute (RPI), Troy, NY (US)

( * ) Notice: Subject to any disclaimer, the term of this patent is extended or adjusted under 35 U.S.C. 154(b) by 1093 days.

(21) Appl. No.: 10/864,833

(22) Filed: Jun. 9, 2004

(65) Prior Publication Data

US 2004/0264576 A1 Dec. 30, 2004

Related U.S. Application Data

(60) Provisional application No. 60/477,183, filed on Jun. 10, 2003.

(51) Int. Cl.
*H04N 7/18* (2006.01)
(52) U.S. Cl. .................. 375/240.26; 375/240.24; 375/240.12; 375/240.13
(58) Field of Classification Search .................. 375/240.01–240.29
See application file for complete search history.

(56) References Cited

U.S. PATENT DOCUMENTS

| | | | |
|---|---|---|---|
| 4,849,810 A | | 7/1989 | Ericsson |
| 5,361,105 A | * | 11/1994 | Iu .............................. 348/699 |
| 5,408,274 A | | 4/1995 | Chang et al. |
| 5,473,384 A | * | 12/1995 | Jayant et al. ................. 348/470 |
| 5,512,956 A | * | 4/1996 | Yan .............................. 348/606 |
| 5,621,467 A | * | 4/1997 | Chien et al. ............. 375/240.15 |
| 5,757,969 A | | 5/1998 | Kim |

(Continued)

FOREIGN PATENT DOCUMENTS

KR 2001-0105361 A 11/2001

(Continued)

OTHER PUBLICATIONS

S. Choi and J. W. Woods, "Motion-compensated 3-D subband coding of video," IEEE Trans. Image Processing, vol. 8, pp. 155-167, Feb. 1999.

(Continued)

*Primary Examiner*—Andy S Rao
(74) *Attorney, Agent, or Firm*—Sughrue Mion, PLLC

(57) ABSTRACT

A method, system, computer program product, and computer system for processing video frames. Frames A and B of a pair of successive video frames each comprise blocks of pixels. Frame A is earlier in time than frame B. A connection state of each pixel in frame B relative to the pixels of frame A is determined. The connection state is a connected state or an unconnected state. Each block in frame B is classified as either unconnected or uni-connected. Uni-connected blocks in frame B satisfying a reclassification criteria are reclassified as being unconnected. Each unconnected block in frame B is categorized as being a P-block or an I-block. Values for the pixels of each I-block in frame B are calculated by spatial interpolation based on values of nearest available neighbor pixels relative to each I-block. A residual error block for each I-block in frame B is generated.

43 Claims, 15 Drawing Sheets

U.S. PATENT DOCUMENTS

| | | | |
|---|---|---|---|
| 6,108,448 | A | 8/2000 | Song |
| 6,381,276 | B1* | 4/2002 | Pesquet-Popescu .... 375/240.11 |
| 7,346,224 | B2* | 3/2008 | Kong et al. ................ 382/261 |
| 2003/0202597 | A1 | 10/2003 | Turaga et al. |
| 2003/0202598 | A1 | 10/2003 | Turaga et al. |
| 2003/0202599 | A1 | 10/2003 | Turaga et al. |
| 2004/0008785 | A1 | 1/2004 | Turaga et al. |
| 2004/0252230 | A1* | 12/2004 | Winder .................... 348/402.1 |

FOREIGN PATENT DOCUMENTS

| | | |
|---|---|---|
| KR | 2002-0081777 A | 10/2002 |
| WO | WO 01/49037 A1 | 7/2001 |
| WO | WO 03/017672 A2 | 2/2003 |

OTHER PUBLICATIONS

Shih-Ta Hsiang and J. W. Woods, "Embedded video coding using invertible motion compensated 3-D subband/wavelet filter bank," Signal Processing: Image Communication, vol. 16, pp. 705-724, May 2001.

J.-R. Ohm, "Three-dimensional subband coding with motion compensation," IEEE Trans. Image Processing, vol. 3, pp. 559-571, Sep. 1994.

B. Pesquet-Popescu and V. Bottreau, "Three-dimensional lifting schemes for motion compensated video compression," Proc. ICASSP, pp. 1793-1796, May 2001.

L. Luo, J. Li, Z. Zhuang, and Y.-Q. Zhang, "Motion Compensated Lifting Wavelet and Its Application to Video Coding," Proc. ICME'01, Tokyo, Japan, Aug. 2001.

P. Chen and J. W. Woods, Improved MC-EZBC with Quarter-pixel Motion Vectors, ISO/IEC JTC1/SC29/WG11 MPEG2002/M8366, May 2002, Fairfax, VA.

T. Rusert, K. Hanke, P. Chen, and J. W. Woods, Recent Improvements to MC-EZBC, ISO/IEC JTC1/SC29/WG11 MPEG2002/M9232, Dec. 2002, Awaji Island, Japan.

Y. Wu and J. W. Woods, Recent Improvement to the MC-EZBC Video Coder, ISO/IEC JTC1/SC29/WG11 MPEG2003/M10396, Dec. 2003, Hawaii, USA.

Peisong Chen, et al., "Bidirectional MC-EZBC With Lifting Implementation", 2004 IEEE, pp. 1183, 1194.

Michael T. Orchard, et al., "Overlapped Block Motion Compensation: An Estimation-Theoretic Approach", 1994 IEEE, pp. 693-699.

Ostermann and Zhang, "Video Processing and Communications", 2002, pp. 182-187.

* cited by examiner

|  | u[0] | u[1] | u[2] | u[3] |  |
|---|---|---|---|---|---|
| lf[0] | in[0] | in[1] | in[2] | in[3] | r[0] |
| lf[1] | in[4] | in[5] | in[6] | in[7] | r[1] |
| lf[2] | in[8] | in[9] | in[10] | in[11] | r[2] |
| lf[3] | in[12] | in[13] | in[14] | in[15] | r[3] |
|  | lw[0] | lw[1] | lw[2] | lw[3] |  |

FIG. 7A

| 45 → | 5 | 4 | 3 | 2 | ← 40 |

| 41 → | 5 | 3 | 2 | 1 |
| 42 → | 3 | 3 | 2 | 2 |
| 43 → | 4 | 4 | 3 | 2 |
| 44 → | 5 | 4 | 3 | 3 |

FIG. 7B  ← 40

| 41 → | 5 | 4 | 3 | 2 |
| 42 → | 5 | 4 | 3 | 2 |
| 43 → | 5 | 4 | 3 | 2 |
| 44 → | 5 | 4 | 3 | 2 |

FIG. 7C

| 0 | -1 | -1 | -1 |
| -2 | -1 | -1 | 0 |
| -1 | 0 | 0 | 0 |
| 0 | 0 | 0 | +1 |

FIG. 8
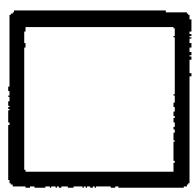 I-block
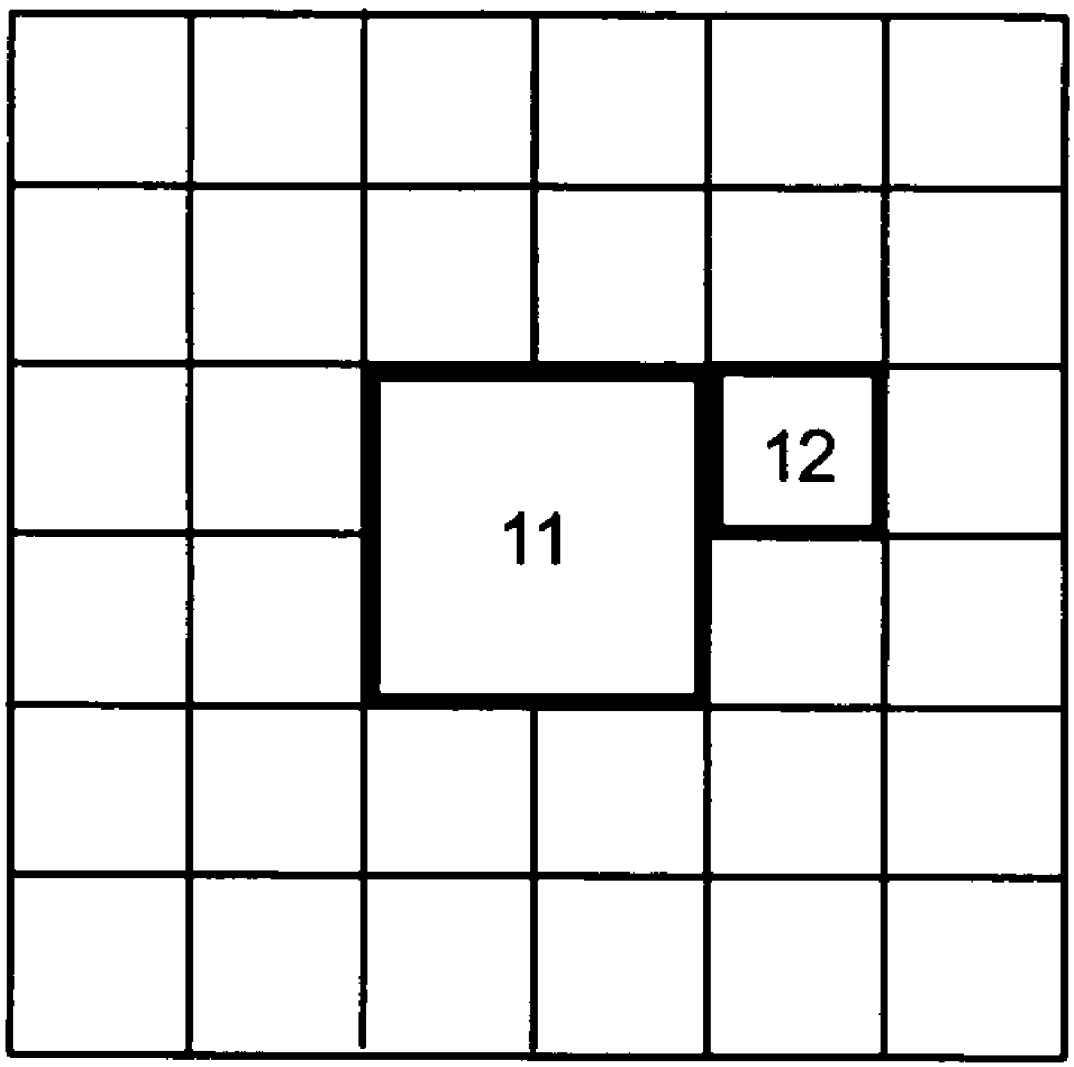

FIG. 9A

| P11 | P12 | P13 | P14 | P15 | P16 | P17 | P18 | P19 |
|-----|-----|-----|-----|-----|-----|-----|-----|-----|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9B

| P11 | P12 | P13 | P14 | P15 | P16 | P17 | P18 | P19 |
|---|---|---|---|---|---|---|---|---|
| P21 | P22 | P23 | P24 | P25 | P26 | P27 Q0 | P28 | P29 |
| P31 | P32 | P33 | P34 | P35 | P36 Q1 | P37 | P38 | P39 |
| P41 | P42 | P43 | P44 | P45 Q2 | P46 | P47 | P48 | P49 |
| P51 | P52 | P53 | P54 Q3 | P55 | P56 | P57 | P58 | P59 |
| P61 | P62 | P63 Q4 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9C

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

60

| P11 | P12 | P13 | P14 61 | P15 | P16 | P17 | P18 | P19 |
|---|---|---|---|---|---|---|---|---|
| P21 | P22 76 | P23 | P24 | P25 | P26 | P27 θ | P28 | P29 |
| P31 | P32 77 | P33 | P34 | P35 | P36 | P37 | P38 | P39 |
| P41 | P42 78 | P43 | P44 | P45 | P46 | P47 | P48 | P49 |
| P51 | P52 79 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 9F

| P11 | P12 | P13 | P14 | P15 | P16 | P17 | P18 | P19 |
|---|---|---|---|---|---|---|---|---|
| P21 | P22 101 | P23 | P24 | P25 | P26 | P27 | P28 | P29 |
| P31 | P32 102 | P33 | P34 | P35 | P36 | P37 | P38 | P39 |
| P41 | P42 103 | P43 | P44 | P45 | P46 | P47 | P48 | P49 |
| P51 | P52 104 | P53 | P54 | P55 | P56 | P57 | P58 | P59 |
| P61 | P62 105 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

FIG. 10

| P11 | P12 | P13 | P14 | P15 | P16 | P17 | P18 | P19 |
|---|---|---|---|---|---|---|---|---|
| P21 | P22 | P23 | P24 | P25 | P26 | P27 | P28 | P29 |
| P31 | P32 | P33 | P34 | P35 | P36 | P37 | P38 | P39 |
| P41 | P42 | P43 | P44 | P45 | P46 | P47 | P48 | P49 |
| P51 | P52 | P53 | P54 | P55 | P56 | P57 | P58 | P59 |
| P61 | P62 | P63 | P64 | P65 | P66 | P67 | P68 | P69 |
| P71 | P72 | P73 | P74 | P75 | P76 | P77 | P78 | P79 |
| P81 | P82 | P83 | P84 | P85 | P86 | P87 | P88 | P89 |
| P91 | P92 | P93 | P94 | P95 | P96 | P97 | P98 | P99 |

METHOD FOR PROCESSING I-BLOCKS USED WITH MOTION COMPENSATED TEMPORAL FILTERING

RELATED APPLICATION

The present invention claims priority to U.S. Provisional Application No. 60/477,183, filed Jun. 10, 2003, which is incorporated herein by reference in its entirety.

GOVERNMENT LICENSE RIGHTS

The invention described herein was supported by funding from the National Science Foundation (EEC-9812706). The U.S. government has certain rights.

BACKGROUND OF THE INVENTION

1. Technical Field

The present invention relates generally to a method, system, computer program product, and computer system for processing video frames, and more specifically to a method, system, computer program product, and computer system for processing I-blocks used with Motion Compensated Temporal Filtering (MCTF).

2. Related Art

Current methods of performing Motion Compensated Temporal Filtering (MCTF) on the pixels in successive video frames generate poor matches between pixels in the successive frames due to a covering and uncovering of spatial regions as the frames progress in time. These poor matches may be caused by an occlusion effect as objects pass in front of one another as the time progresses, causing certain objects or parts of objects to appear and disappear. The poor matches may be caused by other effects, such as the image field of view either expanding or compressing. The resulting poor matches not cause only low coding efficiency but also lead to artifacts in the low frame-rate video output from the MCTF.

Thus, there is a need for a good method of dealing with poor matches in the Motion Compensated Temporal Filtering (MCTF) of pixels in successive video frames, wherein said good method is more efficient and/or more accurate than are the methods which currently exist in the related art.

SUMMARY OF THE INVENTION

The present invention provides a method for processing video frames, comprising:

providing a pair of successive video frames, each pair of frames consisting of frame A and frame B, said frames A and B each comprising blocks of pixels, said frame A being earlier in time than said frame B;

determining a connection state of each pixel in frame B relative to the pixels of frame A, said connection state being a connected state or an unconnected state;

classifying each block in frame B as being either unconnected or uni-connected;

after said classifying, reclassifying uni-connected blocks in frame B as being unconnected for those uni-connected blocks in frame B satisfying a reclassification criteria;

after said reclassifying, categorizing each unconnected block in frame B as a P-block or an I-block;

after said categorizing, calculating values for the pixels of each I-block in frame B by spatial interpolation based on values of nearest available neighbor pixels relative to each I-block; and after said calculating, generating a residual error block for each I-block in frame B.

The present invention provides a system for processing a pair of successive video frames, each pair of frames consisting of frame A and frame B, said frames A and B each comprising blocks of pixels, said frame A being earlier in time than said frame B, said system comprising;

means for determining a connection state of each pixel in frame B relative to the pixels of frame A, said connection state being a connected state or an unconnected state;

means for classifying each block in frame B as being either unconnected or uni-connected;

means for reclassifying uni-connected blocks in frame B as being unconnected for those uni-connected blocks in frame B satisfying a reclassification criteria;

means for categorizing each unconnected block in frame B as a P-block or an I-block;

means for calculating values for the pixels of each I-block in frame B by spatial interpolation based on values of nearest available neighbor pixels relative to each I-block; and means for generating a residual error block for each I-block in frame B.

The present invention provides a computer program product, comprising a computer usable medium having a computer readable program code embodied therein, said computer readable program code comprising an algorithm adapted to implement a method for processing video frames, said method comprising:

providing a pair of successive video frames, each pair of frames consisting of frame A and frame B, said frames A and B each comprising blocks of pixels, said frame A being earlier in time than said frame B;

determining a connection state of each pixel in frame B relative to the pixels of frame A, said connection state being a connected state or an unconnected state;

classifying each block in frame B as being either unconnected or uni-connected;

after said classifying, reclassifying uni-connected blocks in frame B as being unconnected for those uni-connected blocks in frame B satisfying a reclassification criteria;

after said reclassifying, categorizing each unconnected block in frame B as a P-block or an I-block;

after said categorizing, calculating values for the pixels of each I-block in frame B by spatial interpolation based on values of nearest available neighbor pixels relative to each I-block; and after said calculating, generating a residual error block for each I-block in frame B.

The present invention provides a computer system comprising a processor and a computer readable memory unit coupled to the processor, said memory unit containing instructions that when executed by the processor implement a method for processing video frames, said method comprising:

providing a pair of successive video frames, each pair of frames consisting of frame A and frame B, said frames A and B each comprising blocks of pixels, said frame A being earlier in time than said frame B;

determining a connection state of each pixel in frame B relative to the pixels of frame A, said connection state being a connected state or an unconnected state;

classifying each block in frame B as being either unconnected or uni-connected;

after said classifying, reclassifying uni-connected blocks in frame B as being unconnected for those uni-connected blocks in frame B satisfying a reclassification criteria;

after said reclassifying, categorizing each unconnected block in frame B as a P-block or an I-block;

after said categorizing, calculating values for the pixels of each I-block in frame B by spatial interpolation based on values of nearest available neighbor pixels relative to each I-block; and after said calculating, generating a residual error block for each I-block in frame B.

The present invention advantageously provides a good method of dealing with object occlusion in the Motion Compensated Temporal Filtering (MCTF) of pixels in successive video frames, wherein said good method is more efficient and/or more accurate than are the methods which currently exist in the related art.

BRIEF DESCRIPTION OF THE DRAWINGS

FIGS. 7A-7C illustrate spatial interpolation of an I-block for a case in which only one neighbor block is available, in accordance with embodiments of the present invention.

FIG. 8 illustrate a variable block size of I-blocks in a frame, in accordance with embodiments of the present invention.

FIGS. 9A-9F illustrate directional spatial interpolation of an I-block, in accordance with embodiments of the present invention.

FIG. 10 illustrates hybrid spatial interpolation of an I-block, in accordance with embodiments of the present invention.

DETAILED DESCRIPTION OF THE INVENTION

Figure 1:
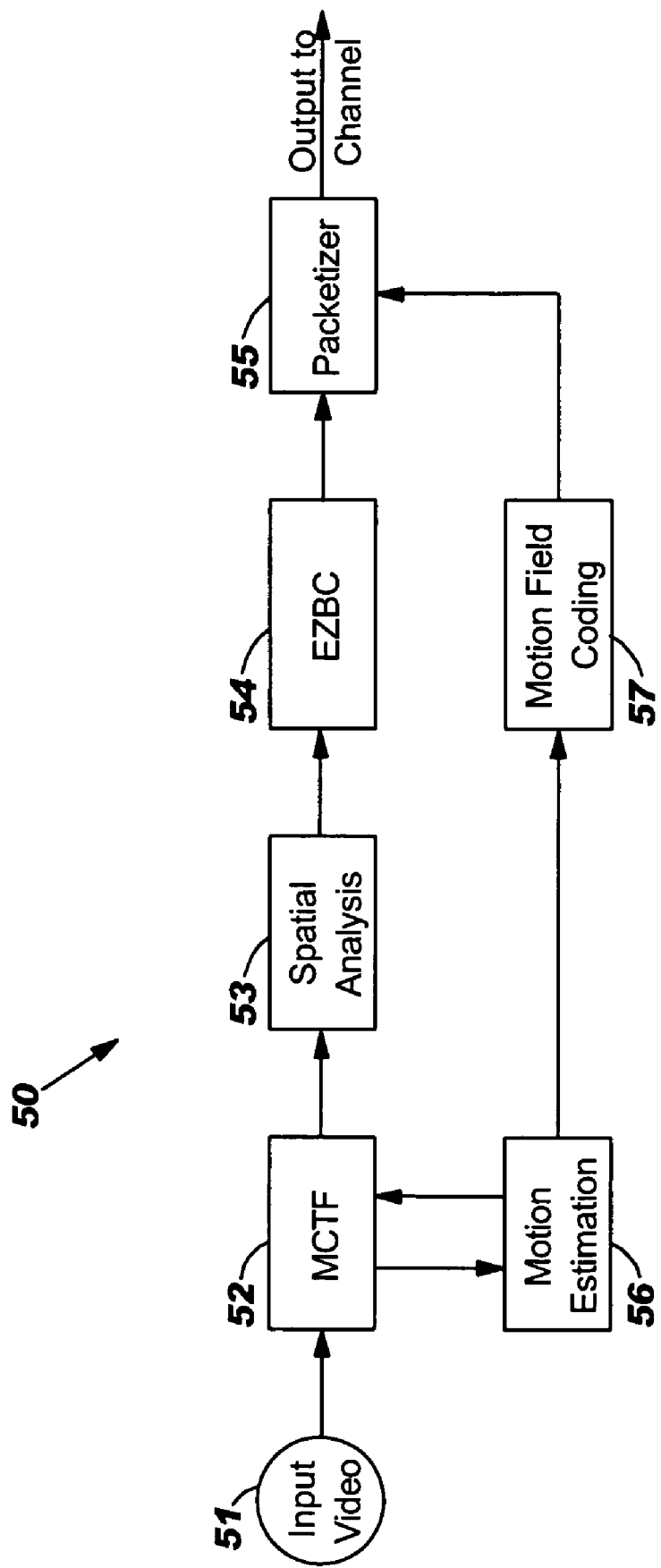
FIG. 1 depicts a video coding system comprising a Motion Compensated Temporal Filtering (MCTF) processor, in accordance with embodiments of the present invention.

The detailed description of the present invention is divided into the sections of: Introduction; Definitions; Motion Compensated Temporal Filtering (MCTF); Processing I-Blocks, and Computer System.

Introduction

Video compression schemes remove redundant information from input video signals before their transmission, by encoding frames of the input video signals into compressed information that represents an approximation of the images comprised by the frames of the input video signals. Following the transmission of the compressed information to its destination, the video signals are reconstructed by decoding the approximation of the images from the compressed information. With temporal redundancy, pixel values are not independent but are correlated with their neighbors across successive frames of the input video signals.

In Moving Pictures Experts Group (MPEG) hybrid coding, temporal redundancy may be removed by motion-compensated prediction (MCP). A video signal is typically divided into a series of groups of pictures (GOP), where each GOP begins with an intra-coded frame (I) followed by an arrangement of forward predictive-coded frames (P) and bidirectional predicted frames (B). Both P-frames and B-frames are interframes. A target macroblock in a P-frame can be predicted from the past reference frame (forward prediction). Bidirectional prediction, also called motion-compensated (MC) interpolation, is an important feature of MPEG video. B-frames coded with bidirectional prediction use two reference frames, one in the past and one in the future. A target macroblock in a B-frame can be predicted from the past reference frame (forward prediction) or from the future reference frame (backward prediction), or by an average of two prediction macroblocks, one from each reference frame (interpolation). The target macroblock in either a P-frame or a B-frame can also be intra coded as an I-block or a P-block as defined infra.

Forward or backward prediction encodes data in a current input frame (i.e., picture) based upon the contents of a preceding or succeeding reference frame, respectively, in consideration of luminance and/or chrominance values at the pixels in both the current input frame and the reference frame. Thus the reference frame used for the predictive encoding is either a preceding reference frame or succeeding reference frame. For a given input block of pixels (e.g., a 16×16 array of pixels) in the current input frame, the predictive encoding utilizes motion compensated prediction (MCP) to successively shift a block in the reference frame, within a predetermined search range, to determine whether there is a 16×16 array of pixels found within the reference frame which has at least a given minimum degree of correlation with the input block. If the given minimum degree of correlation is determined to exist, then the amount and direction of displacement between the found 16×16 pixel array in the reference frame and the input block is obtained in the form of a motion vector (MV), which has horizontal and vertical components. The respective values of the difference between the pixel values (e.g., luminance values, chrominance values, etc.) of the input block and the corresponding pixels within the found 16×16 array of pixels in the reference frame are motion compensated prediction error values. As stated supra, prediction from a preceding reference frame is referred to as forward prediction, and from a succeeding reference frame is referred to as backward prediction. If no correlated 16×16 block in the reference frame is found within the search range, then the input block may be intra-coded within the input frame, and is referred to as an I-block. With bidirectional prediction, values for the input block may be predicted based on two 16×16 blocks of pixels within a preceding and a succeeding reference frame respectively. Note that the preceding discussion of 16×16 pixel blocks is merely illustrative and the scope of the present invention includes pixel blocks of any pixel array size.

With the present invention, an unconnected block within a current input frame is classified to be either an I-block or a P-block. An I-block is defined as an input block in the current input frame that does not have sufficient correlation (e.g., a given minimum degree of correlation) with a corresponding block of pixels in the reference frame that is being used for forward or backward prediction in relation to the frame. Due to the lack of sufficient correlation, an I-block is encoded entirely within the given frame independent of a reference frame. A P-block is encoded: by forward prediction from the reference frame under the assumption that the reference frame precedes the given frame; by backward prediction from the reference frame under the assumption that the reference frame succeeds the given frame; or by bidirectional prediction using both a preceding and succeeding reference frame.

An example of an I-block is a block of newly uncovered pixels in the current input frame having no corresponding pixels in the preceding frame. Other examples of I-blocks include poorly matched motion blocks such as, inter alia, a block of partially covered or partially occluded pixels in the current input frame wherein said block does not have sufficient correlation with a corresponding block of pixels in the reference frame. The present invention provides a method of determining and encoding I-blocks.

Definitions

The following definitions apply herein to the description of the present invention.

"Video coding system" is a system that encodes video data.

"Video coder" is an algorithm which reduces the number of bits necessary to store a video clip by removing redundancy and introducing controlled distortion "Subband/wavelet coder" is a video coder that uses the subband/wavelet transformation in the process of redundancy reduction "Temporal correlation" is a correlation between pixels in adjacent or nearby frames "Spatial correlation" is a correlation between pixels in the same frame "Motion estimation" is estimation of a motion or displacement vector that locates a matching block in another frame "Motion Compensated" (MC) is a process of actually an alignment of a block in the present frame with a matching block in a different frame.

Figure 2:
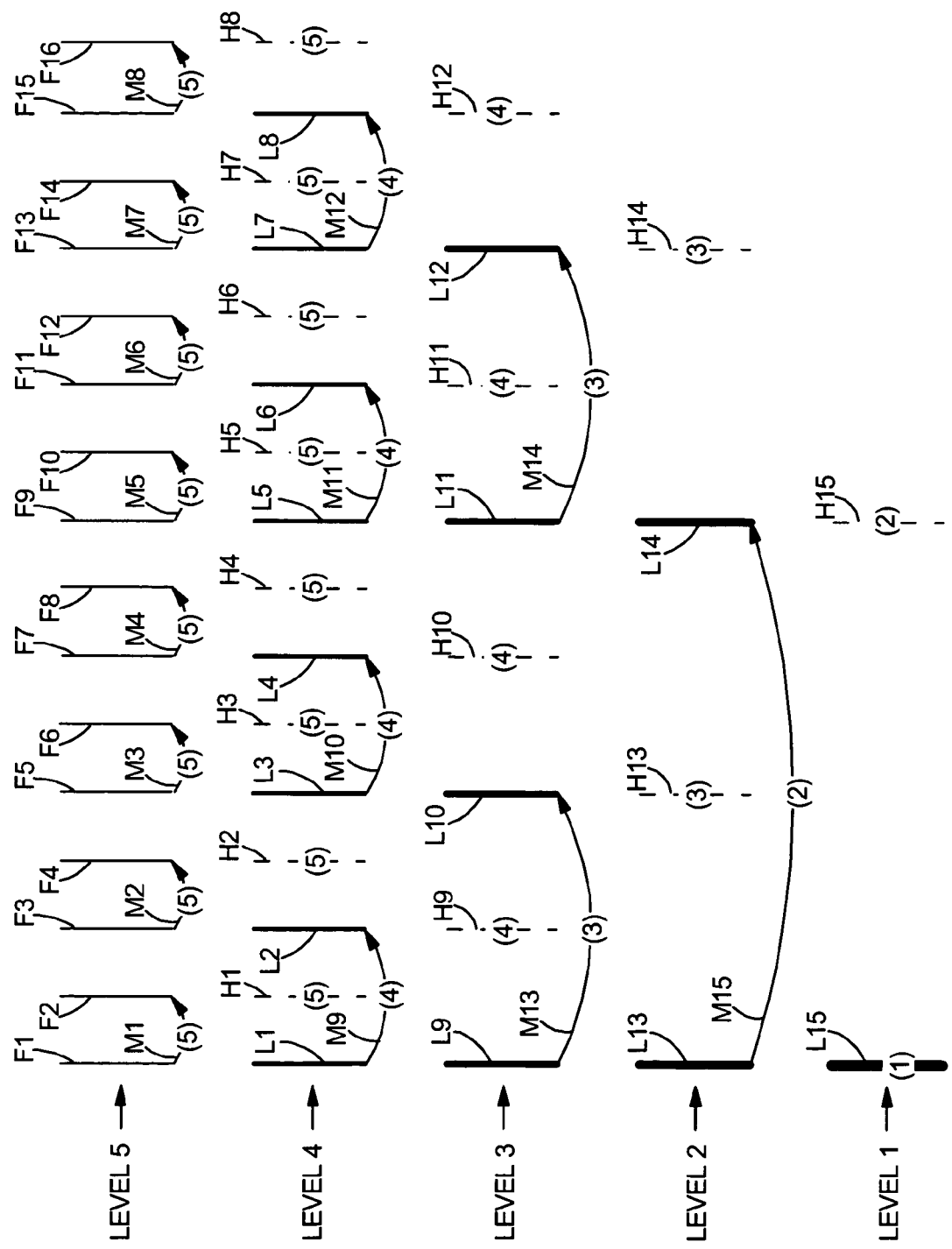
FIG. 2 depicts the MCTF process implemented by the MCTF processor of FIG. 1, in accordance with embodiments of the present invention.

"Motion Compensated Temporal filtering" (MCTF) is a process of filtering a block or array of pixels along the time axis (i.e., motion trajectory) in a manner to be described infra in conjunction with FIG. 2.

"Temporal low frame" is a frame containing the spatial low frequencies that are common in a pair (or larger set) of frames.

"Temporal high frame" is a frame containing the spatial high frequencies that constitute the MC difference in a pair (or larger set) of frames "Temporal redundancy" denotes a dependancy between pixels in adjacent or nearby frames "Block matching" is a method to estimate motion of a block of pixels from a frame to adjacent or nearby frame.

"Variable size block matching" is a block matching motion estimation using variable size blocks to better represent the motion field. Block sizes may range, inter alia, from 4×4 to 64×64.

"Global motion vector" is a motion vector That is used for the entire frame, wherein the pertinent block size is equal to the frame size.

"Local motion vector field" is a motion vector array resulting from use of blocks smaller than a whole frame.

"Motion compensated prediction" (MCP) is a data reduction technique, wherein motion vectors are used to warp a previously transmitted frame prior to its use as a prediction of the current frame, and only the resulting prediction error is quantized and transmitted for this frame.

"Displaced frame difference" (DFD) is an error resulting from a motion compensated prediction.

"Hybrid coder" is a video coder such as MPEG2 that makes use of MC prediction inside a feedback loop to temporally compress the data, and then a spatial transform coder to code the resulting prediction error.

Motion Compensated Temporal Filtering (MCTF)

Scalable video coding is an exploration activity in Moving Picture Experts Group (MPEG), which is one of subcommittees of International Organization for Standardization (ISO). The purpose of MPEG is to design international standards for the transmission and storage of combined audio and video signals. A key element in this is the compression of these audiovisual signals due to their large uncompressed size. A scalable video coder provides an embedded bit stream containing a whole range of bitrates, lower resolutions, and lower frame rates, in addition to the full frame rate and full resolution input to the scalable coder. With said embedding, the lower bitrate result is embedded in each of the higher bitrate streams.

FIG. 1 depicts a video coding system 50, in accordance with embodiments of the present invention. Input video 51 is received by a MCTF processor 52 and comprises a group of pictures (GOP) such as 16 input frames. Each frame has pixels, and each pixel has pixel value for the pixel characteristics of luminance and chrominance. For each block of data processed by the MCTF processor 52, the MCTF processor 52 needs motion information in the form of a motion vector. Accordingly, the Input Video 51 data is sent from the MCTF processor 52 to a Motion Estimation 56 block which determines the motion vectors and sends the determined motion vectors back up to the MCTF processor 52 to perform the motion compensated temporal filtering. In addition, the motion information is coded in the Motion Field Coding processor 57, and then transmitted to the Packetizer 55.

The MCTF processor 52 generates output frames comprising one temporal low frame and multiple temporal high frames of transformed pixel values, derived from the input frames of the Input Video 51 as will be described infra in conjunction with FIG. 2. The generated output frames are processed by Spatial Analysis 53 by being analyzed spatially with a subband wavelet coder, namely a discrete wavelet transform. By using the MCTF processor 52, the video coding system 50 does not suffer the drift problem exhibited by hybrid coders that have feedback loops.

The Spatial Analysis 53 decomposes the generated output frames (i.e, one temporal low frame and multiple temporal high frames) into one low frequency band and bands having increasing scales of higher and higher frequency. Thus, the Spatial Analysis 53 performs a spatial pixel transformation to derive spatial subbands in a manner that is analogous to pixel transformation performed by the MCTF processor 52 in the time domain. The output of Spatial Analysis 53 is uncompressed floating point data and many of the subbands may comprise mostly near zero values.

These spatial subbands in space generated by the Spatial Analysis 53 are sent to EZBC (Embedded Zero Block Coder) 54 which is one of a family of subband/wavelet coders that exploit temporal correlation but is fully embedded in quality/bit-rate, spatial resolution, and frame rate. The EZBC 54 algorithm provides the basic scalability properties by individually coding each spatial resolution and temporal high subband. The EZBC 54 includes a compression block that quantizes the subband coefficients and assigns bits to them. Said quantizing converts the floating point output of Spatial Analysis 53 to a binary bit representation, followed by truncating the binary bit representation to discard relatively insignificant bits such that no more than negligible distortion is generated from said truncation. The EZBC 54 is an adaptive arithmetic coder which converts the fixed bit strings into variable length strings, thereby achieving further compression. Thus, the EZBC 54 is both a quantizer and a variable length coder called a Conditional Adaptive Arithmetic Coder.

Whereas the quantizer is throwing away bits, the variable length coder compresses output from the quantizer losslessly. The bit streams generated by the EZBC 54 are interleaved and sent to the Packetizer 55.

The Packetizer 55 combines the bits of the streams generated by the EZBC 54 with the bits of motion vectors (needed for doing decoding later) transmitted from the Motion Field Coding 57 and breaks the combination of bits up into packets of desired sizes (e.g., internet packets of 500 kilobytes or less). The Packetizer 55 subsequently sends the packets over a communication channel to a destination (e.g., a storage area for storing the encoded video information).

FIG. 2 depicts the MCTF process implemented by the MCTF processor 52 of FIG. 1 for an example GOP size of 16 frames, in accordance with embodiments of the present invention. FIG. 2 shows 5 levels in the MCTF process of successive filtering, namely levels 5, 4, 3, 2, and 1 having 16, 8 4, 2, and 1 frames therein, respectively. Thus, each level N contains $2^{N-1}$ frames for N=1, 2, 3, 4, 5. Level 5 contains the 16 input frames of the Input Video 51 of FIG. 1, namely input frames F1, F2, . . . , F16 ordered in the direction of increasing time from left to right. MC temporal filtering is performed on pairs of frames to produce temporal low (t-L) and high (t-H) subband frames at the next lower temporal scale or frame rate. In FIG. 2, solid lines indicate the temporal low frames and dashed lines indicate the temporal high frames. At ea1ch temporal scale, curved lines indicate the corresponding motion vectors.

The MC temporal filtering is performed four times in FIG. 2 to generate 5 temporal scales or frame rates, the original frame rate and four lower frame rates. The frame rates generated are full rate, ½ full rate, ¼ full rate, ⅛ full rate, and 1/16 full frame rate at levels 5, 4, 3, 2, and 1, respectively. Thus, if the input frame rate were 32 frames per second (fps), then the lowest frame rate out is 2 fps at level 1. In FIG. 2, the lowest frame rate is denoted (1), the next higher frame rate is denoted as (2), etc.

In motion estimation and associated temporal filtering from level 5 to level 4, the Motion Estimation 56 of FIG. 1 performs: motion estimation from: F1 to F2, F3 to F4, F5 to F6, F7 to F8, F9 to F10, F11 to F12, F13 to F14, and F15 to F16 and determines the associated motion vectors M1, M2, M3, M4, M5, M6, M7, and M8, respectively. The MCTF processor 52 of FIG. 1 performs: temporal filtering on frames F1 and F2 to generate temporal low frame L1 and temporal high frame H1; temporal filtering on frames F3 and F4 to generate temporal low frame L2 and temporal high frame H2; temporal filtering on frames F5 and F6 to generate temporal low frame L3 and temporal high frame H3; temporal filtering on frames F7 and F8 to generate temporal low frame L4 and temporal high frame H4; temporal filtering on frames F9 and F10 to generate temporal low frame L5 and temporal high frame H5; temporal filtering on frames F11 and F12 to generate temporal low frame L6 and temporal high frame H6; temporal filtering on frames F13 and F14 to generate temporal low frame L7 and temporal high frame H7; and temporal filtering on frames F15 and F16 to generate temporal low frame L8 and temporal high frame H18. Generally, the frames being temporally filtered into temporal low and temporal high frames are called "child frames". For examples, the F1 and F2 frames are child frames of the L1 and H1 frames. Generally, if corresponding pixel values in the child frames are $V_A$ and $V_B$, then the corresponding pixel values in the temporal low and temporal high frames are proportional to $V_A+V_B$ and $V_{A-VB}$, respectively, in the special case where Haar filters are used for temporal filtering. Thus, pixel values in temporal low frames are proportional to the average of the corresponding pixel values in the child frames. In contrast, pixel values in temporal high frames are proportional to the difference between corresponding pixel values in the child frames. Thus, if the pixel values in the child frames are close to each other, then the pixels in the temporal high frames generally have a low energy (i.e., a large number of near zero values) and are therefore highly compressible.

In motion estimation and associated temporal filtering from level 4 to level 3, the Motion Estimation 56 of FIG. 1 further performs: motion estimation from: L1 to L2, L3 to L4, L5 to L6, and L7 to L8 and determines the associated motion vectors M9, M10, M11, and M12, respectively. The MCTF processor 52 of FIG. 1 further performs: temporal filtering on frames L1 and L2 to generate temporal low frame L9 and temporal high frame H9; temporal filtering on frames L3 and L4 to generate temporal low frame L10 and temporal high frame H10; temporal filtering on frames L5 and L6 to generate temporal low frame L11 and temporal high frame H11; and temporal filtering on frames L7 and L8 to generate temporal low frame L12 and temporal high frame H12.

In motion estimation and associated temporal filtering from level 3 to level 2, the Motion Estimation 56 of FIG. 1 further performs: motion estimation from: L9 to L10 and L11 to L12 and determines the associated motion vectors M13 and M14, respectively. The MCTF processor 11 of FIG. 1 further performs: temporal filtering on frames L9 and L10 to generate temporal low frame L13 and temporal high frame H13; and temporal filtering on frames L11 and L12 to generate temporal low frame L14 and temporal high frame H14.

In motion estimation and associated temporal filtering from level 2 to level 1, the Motion Estimation 56 of FIG. 1 further performs: motion estimation from: L13 to L14 determines the associated motion vector M15. The MCTF processor 52 of FIG. 1 further performs: temporal filtering on frames L13 and L14 to generate temporal low frame L15 and temporal high frame H15.

As a result of the MCTF of FIG. 2, the 16 frames in this 5 level example, consisting of the temporal low frame L15 and the temporal high frames H1, H2, . . . , H15 are transmitted as output from the MCTF processor 52 to the Spatial Analysis 12 of FIG. 1. Since the temporal high frames H1, H2, . . . , H15 may comprise a large number of near zero values, as explained supra, the temporal high frames H1, H2, . . . , H15 frames are amenable to being highly compressed.

Given frames L15, H1, H2, . . . , H15, the frames in Levels 2, 3, 4, and 5 may be regenerated by sequentially reversing the process that generated frames L15, H1, H2, . . . , H15. For example, frames L15 and H15 of Level 1 may be mathematically combined to regenerate frames L13 and L14 of Level 2. Similarly, frames L13 and H13 of Level 2 maybe mathematically combined to regenerate frames L9 and L10 of Level 3, and frames L14 and H14 of Level 2 may be mathematically combined to regenerate frames L11 and L12 of Level 3. This process may be sequentially continued until frames F1, F2, . . . , F16 of Level 1 are regenerated. Since the compression performed by the EZBC 54 of FIG. 1 is lossy, the regenerated frames in Levels 2-5 will be approximately, but not exactly, the same as the original frames in Levels 2-5 before being temporally filtered.

Processing I-Blocks

Because the MCTF decomposition is applied similarly to multiple pairs of frames as explained supra in conjunction with FIG. 2, attention is next focused on a representative pair of successive frames in a level of FIG. 2 (e.g., frames L1 and L2 in level 4). The representative two frames of this pair of successive frames are denoted as frames A and B, wherein forward estimation is performed from frame A to frame B, so that frame A is earlier in time than frame B. Newly uncovered pixels in frame B have no corresponding pixels in frame A. Similarly, occluded pixels in frame A have no corresponding pixel in frame B. The present invention utilizes I-blocks to deal locally with poorly matched motion blocks resulting from the newly uncovered pixels in frame B. For I-blocks identified in accordance with the present invention as described infra, MC temporal filtering is omitted and spatial interpolation is used instead to determine pixel values in the I-block. The resulting spatial interpolation error block for the I-block (also called the residual error block of the interpolated I-block) is subsequently overlayed on (i.e., inserted into) the corresponding block within the associated MCTF temporal high frame.

The present invention discloses a method of compressing video that involves a spatiotemporal or space-time transformation utilizing motion compensated blocks in pairs of input frames, such as the representative pair having input frames A and B. These blocks are of various sizes and are chosen to match the local motion vector field, so there are small blocks where the field has a high spatial gradient and large blocks in more flat regions where the spatial gradient is small. This block based motion field is used to control the spatiotemporal transformation so that it filters along approximate motion trajectories. The output of such a transformation is compressed for transmission or storage.

Some of the blocks may be unconnected with neighbors in the next frame (timewise) because of covering or uncovering of regions in the frame due to motion, e.g. a ball moving in front of a background object that is stationary. Such regions (i.e., I-blocks) should not take part in the MC temporal filtering, since the MC temporal filtering would lead to artifacts in the low frame rate video. These I-blocks need to be compressed along with the other blocks (i.e., P-blocks) in the temporal high frame. The P-blocks can be used to spatially predict the unconnected I-blocks via spatial interpolation. These I-blocks are thus suited to work with non-hybrid MCTF.

Figure 3:
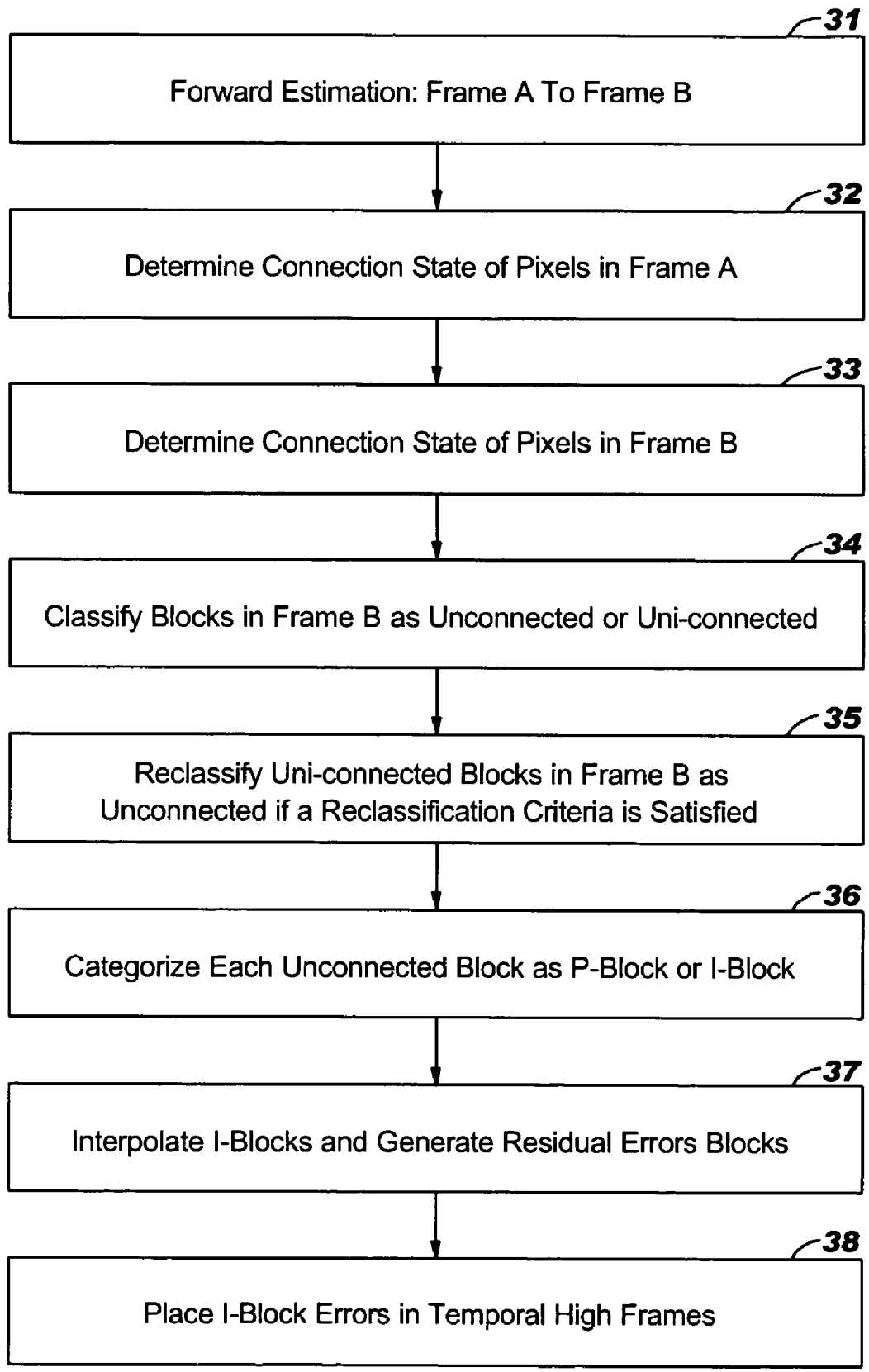
FIG. 3 is a flow chart depicting utilizing I-blocks in temporal high frames generated by the MCTF process of FIG. 2, in accordance with embodiments of the present invention.

FIG. 3 is a flow chart depicting steps 31-38 for utilizing I-blocks in the MCTF temporal high frames, in accordance with embodiments of the present invention.

Step 31 utilizes two successive frames, A and B, in a MCTF filtering level, wherein forward estimation is performed from frame A to frame B. As an example, frames A and B could represent frames F1 and F2 in level 5 of FIG. 2, or frames L1 and L2 in level 4 of FIG. 2.

Figure 4:
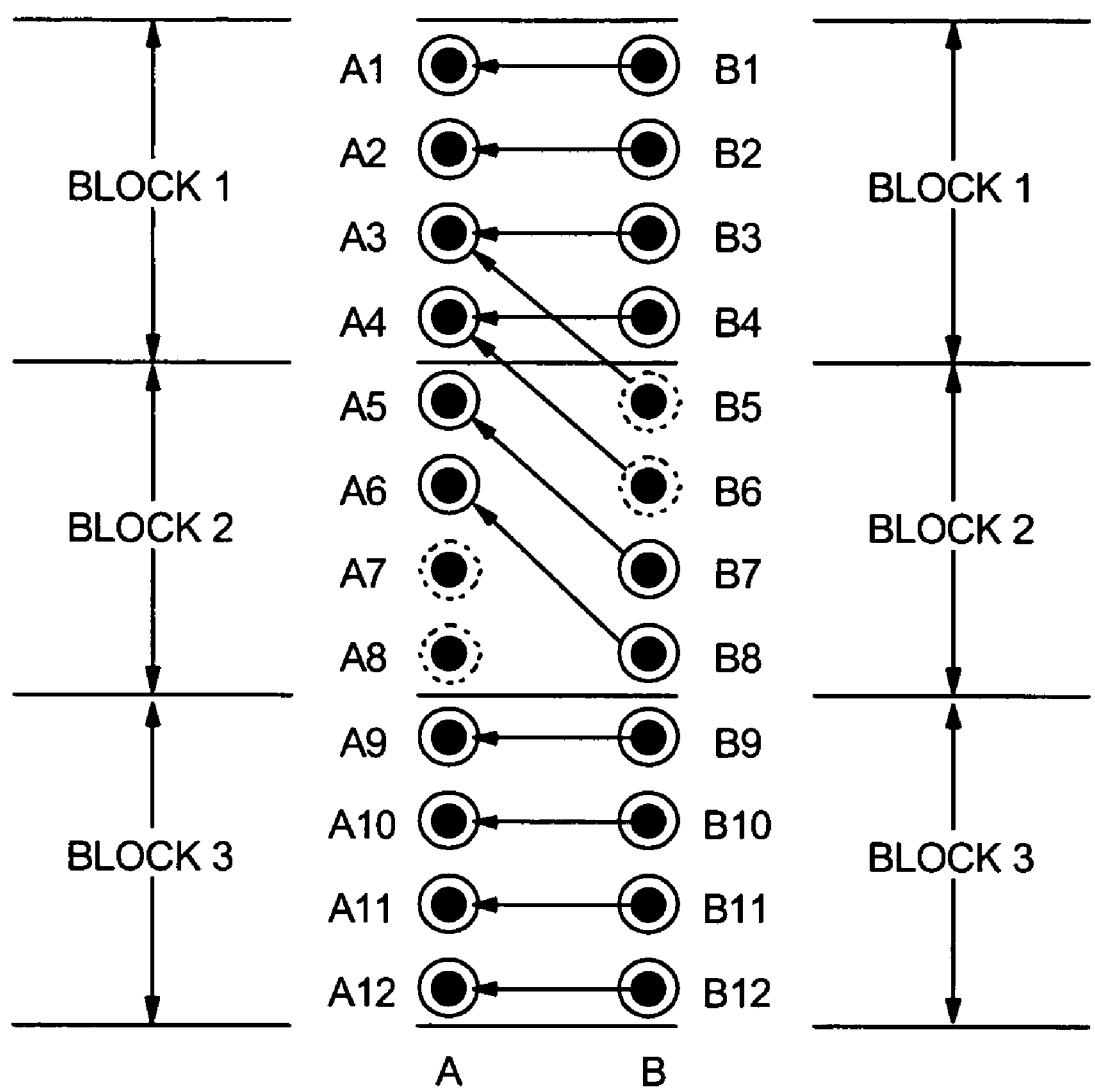
FIG. 4 depicts connections between pixels of successive frames, in accordance with embodiments of the present invention.

Steps 32 and 33 determine the connection state of pixels in frames A and B, respectively, as illustrated in FIG. 4 in accordance with embodiments of the present invention. Each pixel in frames A and B will be classified as having a connection state of "connected" or "unconnected" as follows. FIG. 4 shows pixels A1, A2, . . . , A12 in frame A and Pixels B1, B2, . . . , B12 in frame B. Pixels A1, A2, A3, and A4 are in block 1 of frame A. Pixels A5, A6, A7, and A8 are in block 2 of frame A. Pixels A9, A10, A11, and A12 are in block 3 of frame A. Pixels B1, B2, B3, and B4 are in block 1 of frame B. Pixels B5, B6, B7, and B8 are in block 2 of frame B. Pixels B9, B10, B11, and B12 are in block 3 of frame B. Pixels in frame A are used as references for pixels in frame B in relation to the forward motion estimation from frame A to frame B. Note that the blocks in frames A and B are 4×4 pixel blocks, and FIG. 4 shows only one column of each 4-column block. In FIG. 4, a pixel $P_A$ in frame A that is pointed to by an arrow from a pixel $P_B$ in frame B is being used as a reference for pixel $P_B$. For example, pixel A1 in frame A is being used as a reference for pixel B1 in frame B.

In step 32, a pixel in frame A is labeled as unconnected if not used as a reference by any pixel in frame B. Accordingly, pixels A7 and A8 are unconnected. A pixel in frame A is connected if used as a reference for a pixel in frame B. Accordingly, pixels A1-A6 and A9-A12 are connected. Pixels A3 and A4 require special treatment, however, since pixels A3 and A4 are each being used as a reference by more than one pixel in frame B. For example, pixel A3 is being used as a reference by pixels B3 and B5 of frame B, and the present invention uses an algorithm based on minimum mean-squared displaced frame difference (DFD) (to be defined infra) calculations to retain pixel A3 as a reference for pixel B3 or for pixel B5 but not for both pixels B3 and B5. Noting that pixel A3 is within block 1 of frame A and that pixel B3 is within block 1 of frame B, the algorithm calculates DFD11 which is the mean-squared DFD between block 1 of frame A and block 1 of frame B. Noting that pixel A3 is within block 1 of frame A and that pixel B5 is within block 2 of frame B, the algorithm calculates DFD12 which is the mean-squared DFD between block 1 of frame A and block 2 of frame B. If DFD11 is less than DFD12 then pixel A3 is retained as a reference for pixel B3 and pixel A3 is dropped as a reference for pixel B5. If DFD12 is less than DFD11 then pixel A3 is retained as a reference for pixel B5 and is dropped a reference for pixel B3. If DFD11 is equal to DFD12 then any tie-breaker may be used. A first example of a tie-breaker is "scan order" which means that pixel A3 is retained as a reference for whichever of pixels B3 and B5 is first determined to use pixel A3 as a reference. A second example of a tie-breaker is to pick a random number R from a uniform distribution between 0 and 1, and to retain pixel A3: as a reference for pixel B3 if R is less than 0.5; or as a reference for pixel B5 if R is not less than 0.5. In the example of FIG. 4, DFD11 is less than DFD12 so that pixel A3 is retained as a reference for pixel B3 and dropped as a reference for pixel B5. Similarly, pixels B4 and B6 each use pixel A4 as a reference and the previously-described DFD-based algorithm may be used to retain pixel A4 as a reference for either pixel B4 or pixel B6 but not for both pixels B4 and B6. In the example of FIG. 4, pixel A4 is retained as a reference for pixel B4 and dropped as a reference for pixel B6 based on the previously-described DFD-based algorithm.

In step 33, a pixel in frame B is labeled as unconnected if not using a reference pixel in frame A after the DFD-based algorithm has been applied to resolve those cases in which a pixel in frame A is used as a reference by more than one pixel in frame B. For example, pixels A3 and A4 were dropped as a reference for pixels B5 and B6, respectively, after application of the DFD-based algorithm, as explained supra. Accordingly, pixels B5 and B6 are unconnected. Otherwise pixels in frame B are connected. Accordingly, pixels B1-B4 and B7-B12 are connected. Note that if the previously-described DFD-based algorithm has been executed (i.e., when the connection states of the pixels in frame A were determined) then the arrow pointing from pixel B5 to pixel A3 and the arrow pointing from pixel B6 to pixel A4 in FIG. 4 are irrelevant since pixels A3 and A4 have already been dropped as a reference for pixels B5 and B6, respectively. While FIG. 4 shows step 33 being executed after step 32, step 33 may alternatively be executed before step 32. The previously-described DFD-based algorithm for resolving cases in which a pixel in frame A is used as a reference for more than one pixel in frame B may be executed at any time before, during, or after execution of steps 32 and 33. For example if step 32 is executed prior to step 33, then the previously-described DFD-based algorithm may be executed before step 32, between steps 32 and 33, or after step 33. As another example, if step 33 is executed prior to step 32, then the previously-described DFD-based algorithm may be executed before step 33, between steps 33 and 32, or after step 32.

What is actually needed as a result of executing steps 32 and 33 is the connection state (i.e., connected or unconnected) of each pixel in frame B relative to the pixels of frame A. Thus, step 32 may alternatively be omitted, since the connection state of each pixel in frame B requires knowledge of the reference pixels in frame A for each pixel in frame B but does not require knowledge of the connection state of each pixel in frame A.

The mean-squared DFD between a block in frame A and a block in frame B is defined as follows. Let n denote the number of pixels in each of said blocks. Let $V_{A1}, V_{A2}, \ldots V_{An}$ denote the values (e.g., luminance or chrominance) of the pixels in the block in frame A. Let $V_{B1}, V_{B2}, \ldots, V_{Bn}$ denote the values of the corresponding pixels in the block in frame B. The mean-squared DFD between the block in frame A and the block in frame B is:

$$\text{Mean-squared } DFD = [(V_{A1} - V_{B1})^2 + (V_{A2} - V_{B2})^2 + \ldots + (V_{An} - V_{Bn})^n]/n \quad (1)$$

The previously-described DFD-based algorithm is applicable to motion vectors with sub-pixel accuracy in relation to connections between subpixels, as utilized in high performance video coders. A subpixel is location between adjacent pixels. The interpolated subpixel is used to calculate the DFD. Thus, no other changes in the MCTF algorithm are necessary but the use of a prescribed form of spatial interpolation when the reference pixel is not an integer. As an example, a separable 9-tap FIR interpolation filter may be utilized for this purpose.

After steps 32 and 33 of FIG. 4 have been executed, all pixels in frames A and B have been classified as being "unconnected" or "connected". Since the previously-described DFD-based algorithm eliminates multiple connections from two or more pixels in frame B to a reference pixel in frame A, each "connected" pixels in frame A is connected to exactly one pixel in frame B and vice versa.

Step 34 classifies the blocks in frame B as being "uni-connected" or "unconnected", in accordance with embodiments of the present invention. If at least a fraction F of the pixels in a block of a frame are unconnected, then the block is an "unconnected" block; otherwise the block is a "uni-connected" block. The fraction F has a value reflective of a tradeoff between image quality and processing time, since I-blocks require extra processing time. The fraction F may have a value, inter alia, of at least 0.50 (e.g., in a range of 0.50 to 0.60, 0.50 to 0.75, 0.60 to 0.80, 0.50 to 1.00, 0.30 to 1.00, 0.50 to less than 1.00, etc.). By examining the reference pixels in frame A to which pixels in a uni-connected block in frame B are connected, a matched block in frame A (called a uni-connected block of frame A) may be determined for each uni-connected block in frame B. The resultant uni-connected blocks in frames A and B form a set of matched pairs of uni-connected blocks, wherein each matched pair consists of a uni-connected block in frame B and a matched uni-connected block in frame A. Let the matched pair of uni-connected blocks be denoted as first and second uni-connected blocks in frame A and frame B, respectively.

Step 35 reclassifies the first and second uni-connected blocks of the matched pair of uni-connected blocks as being unconnected if the following reclassification criteria is satisfied, in accordance with embodiments of the present invention. Let $V_1$ and $V_2$ denote the pixel variance of the first and second uni-connected blocks, respectively. The pixel variance of a block is the mean-squared deviation between the pixel values in the block and the mean pixel value for the block. Let $V_{MIN}$ denote the minimum of $V_1$ and $V_2$. Then the first and second uni-connected blocks are reclassified as being unconnected blocks if the mean-squared DFD between the first and second blocks exceeds $fV_{MIN}$, wherein f is a real number in a range of 0 to 1. For example, f may be in a range of, inter alia, 0.4 to 0.6, 0.5 to 0.7, 0.4 to 0.75, 0.5 to 0.9, 0.4 to 1.00, etc. After step 35 is executed, the classification of each block in frame B as "unconnected" or uni-connected" is complete.

Step 36 categorizes each unconnected block in frame B as a P-block or an I-block, in accordance with embodiments of the present invention. An I-block will subsequently have its initial pixel values replaced by spatially interpolated values derived from neighboring pixels outside of the I-block, as will be described infra. The difference between an initial pixel value and a spatially interpolated pixel value of an I-block pixel is the residual error of the interpolated I-block pixel. The block of residual errors at all pixels in the I-block is called a residual error block of, or associated with, the I-block.

To determine whether an unconnected block is an I-block or a P-block, the interpolated I-block is formed, its residual error block is computed, and the absolute value of the sum of the residual errors ($S_{RES}$) in the residual error block is also computed. $S_{RES}$ is called the "residual interpolation error" of the unconnected block. The residual errors are the errors at the pixels of the residual error block. In addition, forward and backward motion is performed on the unconnected block. The sum of the absolute DFDs of the forward and backward motion compensated prediction errors are computed. The minimum of the sum of the absolute DFDs for the forward and backward motion compensated prediction errors ($S_{MC-MIN}$) is determined. $S_{MC-MIN}$ is called the "minimum motion compensated error" of the unconnected block. The unconnected block is classified as an I-block if $S_{RES}$ is less than $S_{MC-MIN}$. The unconnected block is classified as a P-block if $S_{RES}$ is not less than $S_{MC-MIN}$.

In step 37, the I-blocks determined in step 36 are processed by spatial interpolation from available neighboring pixels and the residual error block associated with the interpolated I-block is generated, in accordance with embodiments of the present invention. The blocks in a frame may have a fixed size or a variable size. FIGS. 5-7 and 9 describe infra interpolation embodiments for the fixed block size case in accordance with embodiments of the present invention, and FIG. 8 is used to describe infra the variable block size case in accordance with embodiments of the present invention.

In step 38, the residual error block associated with the interpolated I-block is overlayed on (i.e., placed within) the pertinent temporal high frame associated with the frame pair A and B being analyzed, for subsequent compression of the pertinent temporal high frame by the EZBC 54 after execution of the Spatial Analysis 53 of FIG. 2. FIG. 7C (described infra) shows that the residual error block contains numerous near zero values and is thus suitable for being efficiently compressed.

Figures 5, 6:
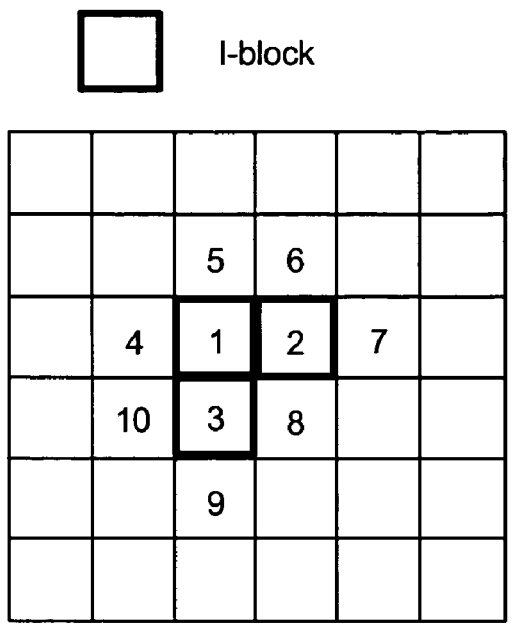
FIG. 5 depicts a frame comprising I-blocks and P-blocks, in accordance with embodiments of the present invention.
FIG. 6 illustrates notation used for spatial interpolation of an I-block, in accordance with embodiments of the present invention.

FIG. 5 shows a frame comprising I-blocks, P-blocks, and uni-connected blocks. The I-blocks comprise blocks 1-3, and the P-blocks and uni-connected blocks comprise the remaining blocks which include blocks 4-10. Each I-block has four possible neighbors: an upper neighbor, a lower neighbor, a left neighbor, and a right neighbor. In the interpolation algorithms used herein, the blocks of a frame are processed in accordance with a scan order and only "available" blocks (i.e., previously processed I-blocks having established pixel values therein, P-blocks having original data therein, and/or uni-connected blocks) can be used for the spatial interpolation. For example, using a scan order of left-to-right and then top-to-bottom in FIG. 5 for block 1, only neighboring blocks 4-5 can be used for the block 1 spatial interpolations, since both block 2 and block 3 are not available. For block 2, however, there are four neighboring blocks available for the block 2 spatial interpolations after block 1 is interpolated, namely blocks 1 and 6-8. Similarly, there are four neighboring blocks available for the block 3 spatial interpolation after block 1 is interpolated, namely blocks 1 and 8-10.

The spatial interpolation is performed following a raster scanning rule such as the aforementioned left-to-right and then top-to-bottom scanning rule. Based on the number of available neighbors and their positions, there are different interpolation functions. FIG. 6 illustrates the following notation: "u" represents the upper neighboring pixels, "1w" represents the lower neighboring pixels, "1f" represent the left neighboring pixels, "r" represents the right neighboring pixels, and "in" represents the interpolated pixel values in the I-block. The interpolation may be linear or non-linear and many different interpolation schemes may be used.

FIGS. 7A-7C (collectively, "FIG. 7") illustrate a case in which only one neighbor block is available. The 4×4 pixel I-block 40 in FIG. 7A is defined by row segments 41-44, and it is assumed that the only available neighbors are in row segment 45 in a neighboring upper block above block 40. The example pixel values shown for I-block 40 in FIG. 7A are the initial values prior to the spatial interpolation. The pixel values in row segment 45 are used for spatial interpolation. For this case, the C-code in Table 1 may be used to effectuate the spatial interpolation.

TABLE 1

```
for (i=0; i<4; i++)
  for (j=0; j<4; j++)
    in[i*4+j] = u[j];
```

FIG. 7B shows the resultant interpolated values in the I-block 40 resulting from execution of the C-code of Table 1. FIG. 7C shows the residual error block determined by subtracting the interpolated pixel values of FIG. 7B from the initial pixel values of FIG. 7A. The residual error block depicted FIG. 7C is overlayed within (i.e., placed within) the pertinent temporal high frame associated with the frame pair A and B being analyzed, for subsequent compression of the pertinent temporal high frame by the EZBC 54 of FIG. 2. While FIGS. 7A-7C described the embodiment in which only upper neighboring pixels are available for interpolation, the cases in which only left, right, or lower neighboring pixels are available for interpolation may be derived analogously from the "upper" neighboring case described supra, or by a proper coordinate rotation.

Tables 2 and 3 illustrate interpolation algorithms in which two neighboring blocks are available. Table 2 specifies formulas for calculating the interpolated pixel values in [0] ... in[15] (see FIG. 6) in the 4×4 I-block using available neighboring pixels in the upper and left positions in accordance with the notation of FIG. 6. Table 3 specifies C-code for calculating the interpolated pixel values in[0] ... in[15] in the 4×4 I-block using neighboring pixels in the upper and lower positions in accordance with the notation of FIG. 6.

TABLE 2

| in[0] = (lf[0] + u[0])/2; | in[1] = u[1]; | in[2] = u[2]; | in[3] = u[3]; |
|---|---|---|---|
| in[4] = lf[1]; | in[5] = (in[4] + in[1])/2; | in[6] = in[2]; | in[7] = in[3]; |

TABLE 2-continued

| in[8] = lf[2]; | in[9] = in[8]; | in[10] = (in[9] + in[6])/2; | in[11] = in[7]; |
|---|---|---|---|
| in[12] = lf[3]; | in[13] = in[12]; | in[14] = in[13]; | in[15] = (in[11] + in[14])/2 |

TABLE 3

```
for (i=0; i<4; i++)
{
  in[i]=u[i];
  in[12+i]=lw[i];
  in[4+i] = in[8+i] = (u[i]+lw[i])/2;
}
```

Other embodiments in which two neighboring blocks are available may be derived analogously from the "upper and left" or "upper and lower" neighboring cases described supra in conjunction with Tables 2 and 3, respectively, or by a proper coordinate rotation.

Table 4 illustrates interpolation algorithms in which three neighboring blocks are available. Table 4 specifies C-code for calculating the interpolated pixel values in[0] ... in[15] (see FIG. 6) in the 4×4 I-block using neighboring pixels in the upper, left, and right positions in accordance with the notation of FIG. 6.

TABLE 4

| in[0] = (lf[0] + u[0])/2; | in[1] = u[1]; | in[2] = u[2]; | in[3] = (u[3] + r[0])/2; |
|---|---|---|---|
| in[4] = lf[1]; | in[5] = (in[4] + in[1])/2; | in[7] = r[1]; | in[6] = (in[2] + in[7])/2; |
| in[8] = lf[2]; | in[9] = in[8]; | in[11] = r[2]; | in[10] = in[11]; |
| in[12] = lf[3]; | in[13] = in[12]; | in[15] = r[3]; | in[14] = in[15]; |

Other embodiments in which three neighboring blocks are available may be derived analogously from the "upper, left, and right" neighboring case described supra in conjunction with Table 4, or by a proper coordinate rotation.

Table 5 illustrates interpolation algorithms in which four neighboring blocks are available. Table 5 specifies C-code for calculating the interpolated pixel values in[0] ... in[15] (see FIG. 6) in the 4×4 I-block using neighboring pixels in the upper, lower, left, and right positions in accordance with the notation of FIG. 6.

TABLE 5

| in[0] = (lf[0] + u[0])/2; | in[1] = u[1]; | in[2] = u[2]; | in[3] = (u[3] + r[0])/2; |
|---|---|---|---|
| in[4] = lf[1]; | in[5] = (in[4] + in[1])/2; | in[7] = r[1]; | in[6] = (in[2] + in[7])/2; |
| in[12] = (lf[3] + lw[0])/2; | in[13] = lw[1]; | in[14] = lw[2]; | in[15] = (lw[3] + r[3])/2; |
| in[8] = lf[2]; | in[9] = (in[8] + in[13])/2; | in[11] = r[2]; | in[10] = (in[14] + in[11])/2 |

FIG. 8 illustrates the variable block size case, which arises from 5-level hierarchical variable size block matching where block sizes range from 4×4 to 64×64. For example in FIG. 8, I-blocks 11 and 12 are shown. Block 11 has a pixel size of 8×8 and block 12 has a pixel size of 4×4. If I-blocks 11 and 12 are processed in the previously mentioned left-to-right and then top-to-bottom scanning order (i.e., block 11 is interpolated before block 12 is interpolated) then block 12 will not be available for block 11's interpolation. To simplify the interpolation, block 11 may be treated as 4 separate 4×4 I-blocks for interpolation purposes, so that the spatial interpolation may be implemented as fixed-block interpolation.

FIGS. 9A-9F (collectively, "FIG. 9") illustrate a directional spatial interpolation scheme for determining pixel values for I-blocks, in accordance with embodiments of the present invention. FIGS. 9A-9F depict a 4×4 I-block 61 within a portion of a frame 60. The portion of the frame 60 contains pixels P11 . . . P99. I-block 61 contains pixels P22, P23, P24, P25, P32 P33, P34, P35, P42, P43, P44, P45, P52, P53, P54, and P55. In FIGS. 9A-9F, all pixels not in I-block 61 are neighbors of the pixels in I-block 61. The interpolation for the pixels in I-block 61 are along parallel lines making a fixed angle θ with the X axis as illustrated by one of the parallel lines, namely line 66, shown in FIG. 9A. Each Figure of FIGS. 9B-9F represents an embodiment with a different value of θ. For the purpose of estimating values of θ for illustrative purposes, it is assumed for simplicity that each pixel is a square. Thus, θ=45 degrees for the line 66 in FIG. 9A which passes through diagonally opposite vertices of pixels P25, P34, P43, and P52. Of course, θ will differ from 45 degrees for line 66 in FIG. 9A if the pixels have a rectangular, non-square shape. Note that θ and θ+180 degrees represent the same set of parallel lines. The interpolations along each such line utilizes pixel values of the nearest available neighbors on the line, wherein an available neighbor is a neighbor whose pixel value has been previously established. The directional interpolation scheme assumes that at least one neighbor is always available for each such line of the parallel lines.

FIG. 9B illustrates a directional interpolation such that θ=45 degrees with respect to parallel lines 63, 64, . . . , 69. Lines 63, 64, . . . , 69 are called "directional lines." Since line 63 passes though pixel P22, line 63 is used to determine the value of pixel P22 based on interpolation using: neighbors P13 and P31 if both P13 and P31 are available; only neighbor P13 if P13 is available and P31 is not available; or only neighbor P31 if P31 is available and P13 is not available. Since line 64 passes though pixels P23 and P32, line 64 is used to determine the value of pixels P23 and P32 based on interpolation using: neighbors P14 and P41 if both P14 and P41 are available; only neighbor P14 if P14 is available and P41 is not available; or only neighbor P31 if P31 is available and P13 is not available. Similarly, interpolations along lines 65, 66, 67, 68, and 69 are used to determine pixel values at (P24, P33, P42), (P25, P34, P43, P52), (P35, P44, P53), (P45, P54), and (P55), respectively.

Lines 67-69 present alternative possibilities for nearest neighbors. For example, line 68 has neighbors (P36, P27, and P18) and (P63, P72, and P81) at opposite borders of the I-block 61. In choosing which neighbor of the neighbors (P36, P27, and P18) to use, the directional interpolation will use pixel P36 if available since pixel P36 is the nearest neighbor of the neighbors (P36, P27, and P18). If pixel P36 is unavailable then the directional interpolation will use pixel P27 if available since pixel P27 is the nearest neighbor of the neighbors (P27 and P18). If pixel P27 is unavailable then the directional interpolation will use the remaining neighbor pixel P18 if available. If pixel P18 is unavailable then the directional interpolation will not use any of pixels (P36, P27, and P18). Similarly, the directional interpolation will choose one pixel of neighbor pixels (P63, P72, and P81) based on the nearest available neighbor criteria for making this choice. Therefore, as a result of the applying the nearest available neighbor criteria, the directional interpolation along line 68 for determining the values of pixels P45 and P54 will utilize one of the following neighbor combinations: P63 alone, P72 alone, P81 alone, P63 and P36, P63 and P27, P63 and P18, P72 and P36, P72 and P27, P72 and P18, P81 and P36, P81 and P27, P81 and P18, P36 alone, P27 alone, and P18 alone.

The directional interpolation for linear interpolation along line 68 is next illustrated for determining pixel values for pixels P45 and P54, assuming that neighbor pixels P36 and P63 are both available. The points Q0, Q1, Q2, Q3, and Q4 along line 68 are as shown in FIG. 9B. Point Q0, Q1, Q2, Q3, and Q4 is at the midpoint of the portion of line 68 that respectively spans pixel P27, P36, P45, P54, and P63. Let D12, D13, and D14 respectively denote the distance between point Q1 and point Q2, Q3, and Q4. Let F1214 and F1314 respectively denote D12/D14 and D13/D14. Let V36 and V63 respectively denote the pixel value at pixel P36 and P63. Then the pixel value at pixel P45 and P54 is (1−F1214)*V36+F1214*V63 and (1−F1314)*V36+F1314*V63, respectively.

The directional interpolation for linear interpolation along line 68 raises the question of how to do the interpolation if neighbor pixel P36 in not available and neighbor pixel P27 is available. If V27 denotes the pixel value at pixel P27 then V27 will substitute for V36 wherever V36 appears in the interpolation formula. However, the scope of the present invention includes three options for treating the distances along line 68.

A first option is to retain the parameters F1214 and F1314 in the interpolation formulas, which is conceptually equivalent utilizing point Q1 as a reference for measuring distances even though pixel P36 has been replaced by pixel P27 as the nearest available neighbor. For the first option, the pixel value at pixel P45 and P54 is (1−F1214)*V27+F1214*V63 and (1−F1314)*V27+F1314*V63, respectively.

A second option is to utilize distances from point Q0 where line 68 begins at neighbor pixel P27. For the second option, D02, D03, and D04 respectively denote the distance between point Q0 and point Q2, Q3, and Q4. Let F0204 and F0304 respectively denote D02/D04 and D03/D04. Then the pixel value at pixel P45 and P54 is (1−F0204)*V27+F0204*V63 and (1−F0304)*V27+F0304*V63, respectively.

A third option is to use a compromise between the first and second options. Instead of using either (F1214 and F1314) or (F0204 and F0304) as in the first and second options, the parameters (F1214,F0204)$_{AVE}$ and (F1314,F0304)$_{AVE}$ are used, wherein (F1214,F0204)$_{AVE}$ is a weighted or unweighted average of F1214 and F0204, and (F1314,F0304)$_{AVE}$ is a weighted or unweighted average of F1314 and F0304. Then the pixel value at pixel P45 and P54 is (1−(F1−(F1214, F0204)$_{AVE}$)*V27+(F1214,F0204)$_{AVE}$*V63 and (F1314, F0304)$_{AVE}$*V27+(F1314,F0304)$_{AVE}$*V63, respectively. If (F1214,F0204)$_{AVE}$ and (F1314,F0304)$_{AVE}$ are weighted averages, the weighting could be based on extrinsic factors such as an extrinsic knowledge of the relative importance of pixels P36 and P27 to the image quality of the I-block 61 along line 68, irrespective of the distances of pixels P36 and P27 from points Q2 and Q3 along line 68.

Figure 9D:
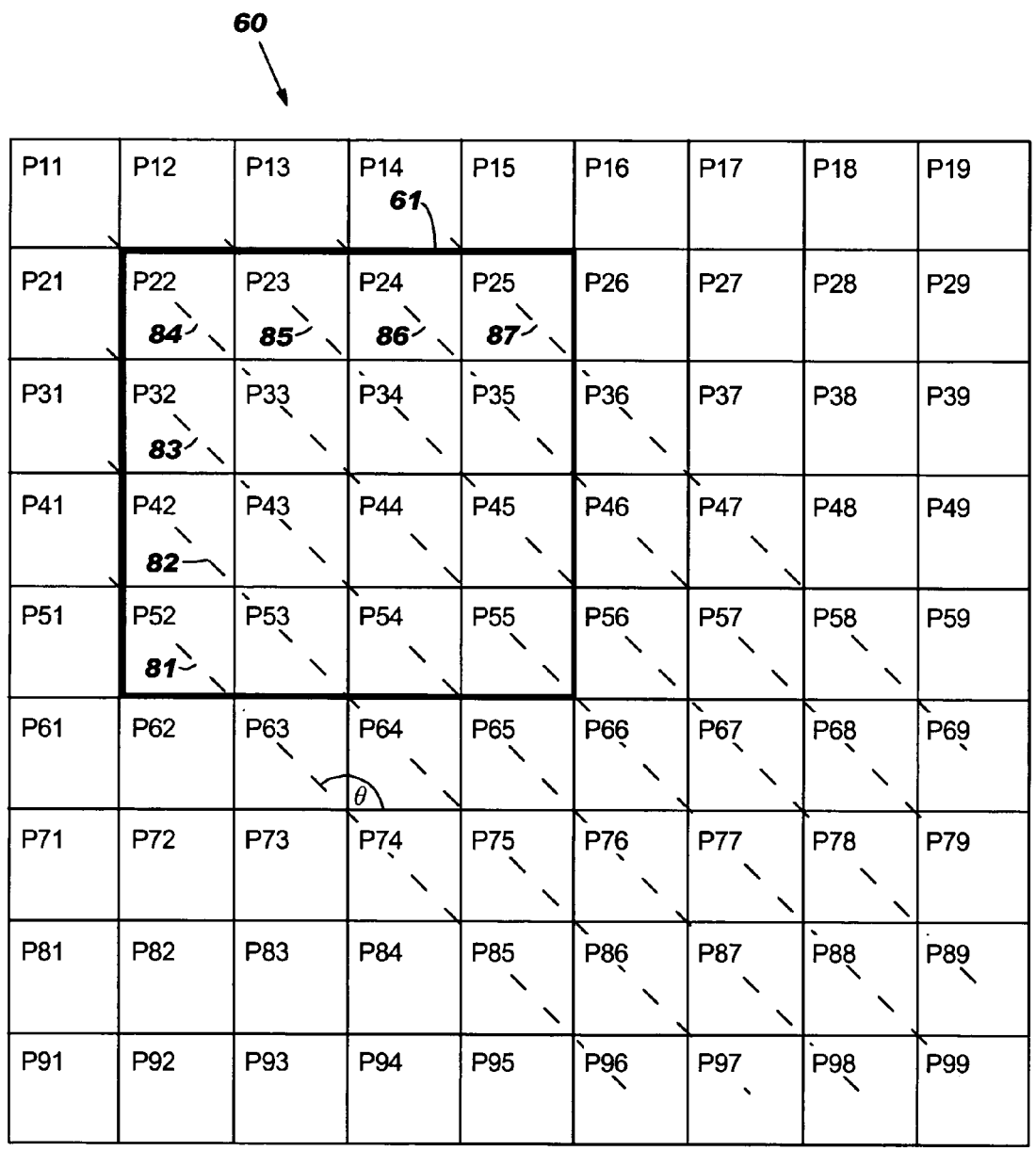

FIGS. 9C-9F are similar to FIG. 9B except for the value of θ. In FIG. 9C, θ=90 degrees for directional lines 71-74. Values at pixels P22, P32, P42, and P52 are determined from interpolation along line 71, using a subset of neighbor pixels P12, P62, P72, P82, and P92. Values at pixels P23, P33, P43, and P53 are determined from interpolation along line 72, using a subset of neighbor pixels P13, P63, P73, P83, and P93. Values at pixels P24, P34, P44, and P54 are determined from interpolation along line 73, using a subset of neighbor pixels P14, P64, P74, P84, and P94. Values at pixels P25, P35, P45, and P55 are determined from interpolation along line 74, using a subset of neighbor pixels P15, P65, P75, P85, and P95.

In FIG. 9D, θ=135 degrees for directional lines 81-87. The value at pixel P52 is determined from interpolation along line 81, using a subset of neighbor pixels P41, P63, P74, P85, and P96. Values at pixels P42 and P53 are determined from interpolation along line 82, using a subset of neighbor pixels P31, P64, P75, P86, and P97. Values at pixels P32, P43, and P54 are determined from interpolation along line 83, using a subset of neighbor pixels P21, P65, P76, P87, and P98. Values at pixels P22, P33, P44, and P55 are determined from interpolation along line 84, using a subset of neighbor pixels P11, P66, P77, P88, and P99. Values at pixels P23, P34, and P45 are determined from interpolation along line 85, using a subset of neighbor pixels P12, P56, P67, P78, and P89. Values at pixels P24 and P35 are determined from interpolation along line 86, using a subset of neighbor pixels P13, P46, P57, P68, and P79. The value at pixel P25 is determined from interpolation along line 87, using a subset of neighbor pixels P14, P36, P47, P58, and P69.

Figure 9E:

In FIG. 9E, θ=0 degrees (or 180 degrees) for directional lines 76-79. Values at pixels P22, P23, P24, and P25 are determined from interpolation along line 76, using a subset of neighbor pixels P21, P26, P27, P28, and P29. Values at pixels P32, P33, P34, and P35 are determined from interpolation along line 77, using a subset of neighbor pixels P31, P36, P37, P38, and P39. Values at pixels P42, P43, P44, and P45 are determined from interpolation along line 78, using a subset of neighbor pixels P41, P46, P47, P48, and P49. Values at pixels P52, P53, P54, and P55 are determined from interpolation along line 79, using a subset of neighbor pixels P51, P56, P57, P58, and P59.

In FIG. 9F, θ=26.56 degrees (i.e., θ is the inverse tangent of 2/4) for directional lines 101-105. Values at pixels P22 and P23 are determined from interpolation along line 101, using a subset of neighbor pixels P31 and P14. Values at pixels P32, P33, P24, and P25 are determined from interpolation along line 102, using a subset of neighbor pixels P41 and P16. Values at pixels P42, P43, P34, and P35 are determined from interpolation along line 103, using a subset of neighbor pixels P51, P26, P27, P18, and P19. Values at pixels P52, P53, P44, and P45 are determined from interpolation along line 104, using a subset of neighbor pixels P61, P36, P37, P28, and P29. Values at pixels P54 and P55 are determined from interpolation along line 105, using a subset of neighbor pixels P71, P46, P47, P38, and P39.

FIGS. 9A-9F illustrate directional spatial interpolation characterized by all pixel values in the I-block being determined by spatial interpolation along parallel directional lines. In contrast, FIGS. 7A-7C and Tables 1-5 illustrate nondirectional spatial interpolation characterized by all pixel values in the I-block being determined by nearest available neighbor spatial interpolation in which no directional line passing through the I-block is utilized in the spatial interpolations. Another spatial interpolation method for an I-block is hybrid spatial interpolation which comprises a combination of directional spatial interpolation and nondirectional spatial interpolation. With hybrid spatial interpolation, at least one directional line is used for some spatial interpolations in the I-block, and some pixel values in the I-block are determined by nearest available neighbor spatial interpolation in which no directional line passing through the I-block is utilized. When directional spatial interpolation or hybrid spatial interpolation is used, the chosen direction and hybrid mask must be coded and transmitted as side information. An embodiment of the present invention uses a short fixed Huffman code for this purpose.

FIG. 10 illustrates hybrid spatial interpolation, in accordance with embodiments of the present invention. FIG. 10 includes directional lines 121-124 which are used in the spatial interpolations for determining values at pixels P25, P34, P43, and P52 (along line 121), pixels P35, P44, and P53 (along line 122), pixels P45 and P54 (along line 123), and pixel P55 (along line 124). However, values at pixels P22, P23, P24, P32, P33, and P42 are determined by nondirectional spatial interpolation using nearest neighbor upper pixels P12, P13, P14 and nearest neighbor left pixels P21, P31, and P41.

As illustrated in the preceding spatial interpolation examples associated with FIGS. 6-10 and Tables 1-5, the values for the pixels of each I-Block in a given frame are calculated by spatial interpolation based on values of nearest available neighbor pixels relative to each said I-block in the given frame. A given pixel outside of a specified I-block of the given frame is said to be a neighbor pixel relative to the I-block if said given pixel is sufficiently close to the I-block to potentially contribute to the value of a pixel in the I-block by said spatial interpolation.

The preceding discussion herein in conjunction with FIGS. 6-10 and Tables 1-5 for determining values of pixels in I-blocks by interpolation focused on linear interpolation. Nonetheless, the scope of the present invention includes nonlinear interpolation as well in accordance with any nonlinear interpolation scheme that exploits the relative importance of the various neighboring pixels which contribute to the value of the pixels in the I-block.

Figure 11:
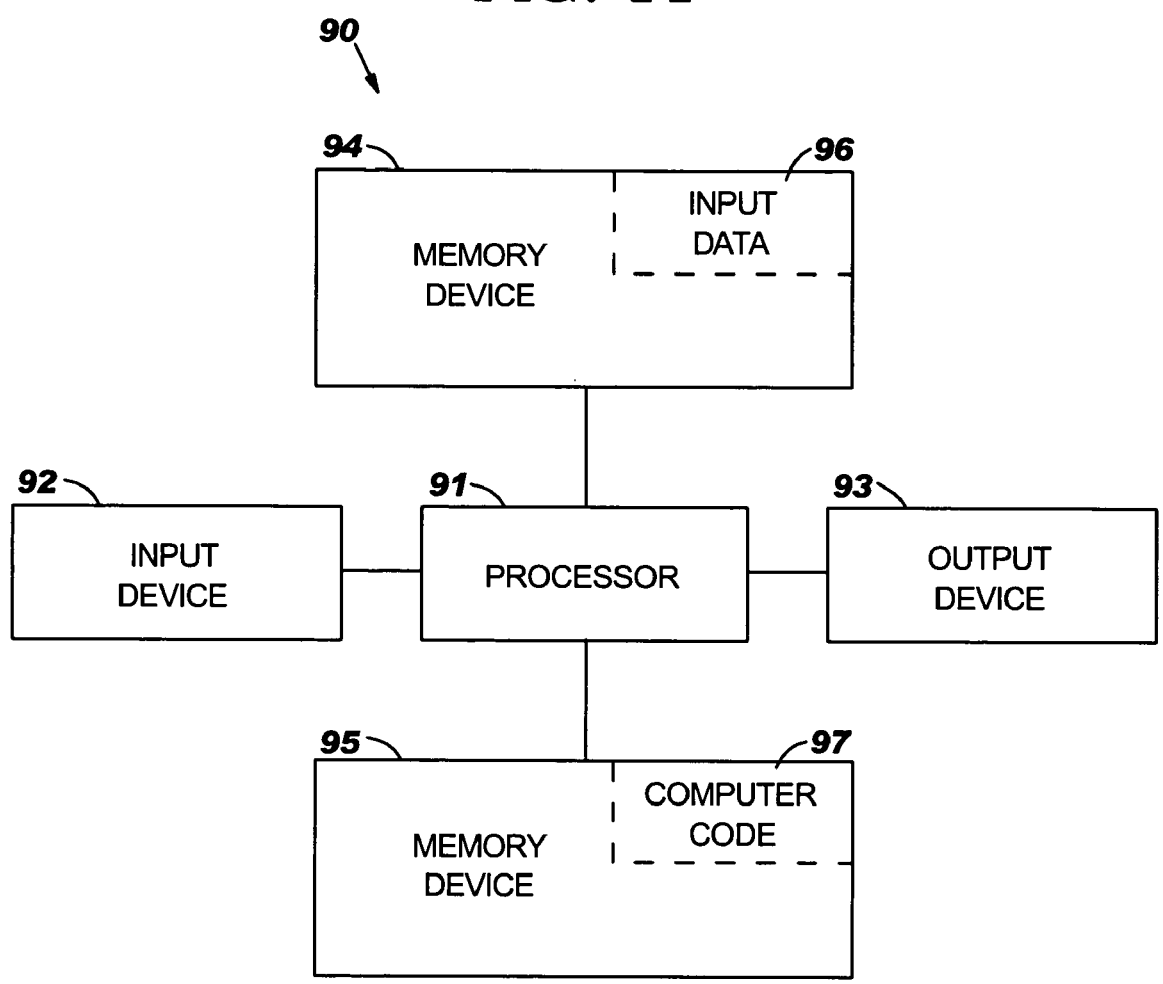
FIG. 11 illustrates a computer system for processing I-blocks used with MCTF, in accordance with embodiments of the present invention.

FIG. 11 illustrates a computer system 90 for processing I-blocks used with Motion Compensated Temporal Filtering (MCTF), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, an internal hard disk or disk array, a removable hard disk, a floppy disk, information network, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for processing I-blocks used with Motion Compensated Temporal Filtering (MCTF). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for processing video frames using a processor, comprising:
   providing, by the processor, a pair of successive video frames, each pair of frames consisting of frame A and frame B, said frames A and B each comprising blocks of pixels, said frame A being earlier in time than said frame B;
   determining, by the processor, a connection state of each pixel in frame B relative to the pixels of frame A, wherein said determining comprises eliminating multiple connections between the pixels in frame B and the pixels in frame A such that said connection state is a uni-connected state or an unconnected state;
   after said determining, classifying, by the processor, each block in frame B as being either unconnected or uni-connected;
   after said classifying, reclassifying, by the processor, uni-connected blocks in frame B as being unconnected for those uni-connected blocks in frame B satisfying a reclassification criteria;
   after said reclassifying, categorizing, by the processor, each unconnected block in frame B as a P-block or an I-block;
   after said categorizing, calculating, by the processor, values for the pixels of each I-block in frame B by spatial interpolation based on values of nearest available neighbor pixels relative to each I-block; and
   after said calculating, generating, by the processor, a residual error block for each I-block in frame B.

2. The method of claim 1, further comprising:
   performing, by the processor, Motion Compensated Temporal Filtering (MCTF) on the pixels in frames A and B to generate a temporal low frame and a temporal high frame; and
   inserting, by the processor, the residual error block for each I-block in frame B into a corresponding block in the temporal high frame.

3. The method of claim 2, further comprising after said inserting: compressing, by the processor, the temporal high frame.

4. The method of claim 1, said spatial interpolation being a linear spatial interpolation.

5. The method of claim 1, said spatial interpolation being a nonlinear spatial interpolation.

6. The method of claim 1, said spatial interpolation being a directional spatial interpolation.

7. The method of claim 1, said spatial interpolation being a non-directional spatial interpolation.

8. The method of claim 1, said spatial interpolation being a hybrid spatial interpolation.

9. The method of claim 1, said classifying comprising:
   classifying, by the processor, as being unconnected each block in frame B having at least a fraction F of its pixels in the unconnected state; and
   classifying, by the processor, as being uni-connected each block in frame B having less than the fraction F of its pixels in the unconnected state, said fraction F having a value in a range of 0.30 to 1.00.

10. A method for processing video frames using a processor, comprising:
    providing, by the processor, a pair of successive video frames, each pair of frames consisting of frame A and frame B, said frames A and B each comprising blocks of pixels, said frame A being earlier in time than said frame B;
    determining, by the processor, a connection state of each pixel in frame B relative to the pixels of frame A, said connection state being a connected state or an unconnected state;
    classifying, by the processor, each block in frame B as being either unconnected or uni-connected;
    after said classifying, reclassifying, by the processor, uni-connected blocks in frame B as being unconnected for those uni-connected blocks in frame B satisfying a reclassification criteria;
    after said reclassifying, categorizing, by the processor, each unconnected block in frame B as a P-block or an I-block;
    after said categorizing, calculating, by the processor, values for the pixels of each I-block in frame B by spatial interpolation based on values of nearest available neighbor pixels relative to each I-block; and
    after said calculating, generating, by the processor, a residual error block for each I-block in frame B,
    wherein said classifying comprises:
       determining, by the processor, a matched block in frame A for each uni-connected block in frame B; and
       reclassifying, by the processor, a uni-connected block in frame B as being unconnected if the mean-squared displaced frame difference (DFD) between the uni-connected block in frame B and its matched block in frame A exceeds $fV_{MIN}$, said $V_{MIN}$ being the minimum of $V_1$ and $V_2$, said $V_1$ and $V_2$ being respectively the pixel variance of the uni-connected block in frame B and the pixel variance of its matched block in frame A, said f being in a range of 0.40 to 1.00.

11. A method for processing video frames using a processor, comprising:
    providing, by the processor, a pair of successive video frames, each pair of frames consisting of frame A and frame B, said frames A and B each comprising blocks of pixels, said frame A being earlier in time than said frame B;
    determining, by the processor, a connection state of each pixel in frame B relative to the pixels of frame A, said connection state being a connected state or an unconnected state; classifying, by the processor, each block in frame B as being either unconnected or uni-connected;
    after said classifying, reclassifying, by the processor, uni-connected blocks in frame B as being unconnected for those uni-connected blocks in frame B satisfying a reclassification criteria;
    after said reclassifying, categorizing, by the processor, each unconnected block in frame B as a P-block or an I-block;
    after said categorizing, calculating, by the processor, values for the pixels of each I-block in frame B by spatial interpolation based on values of nearest available neighbor pixels relative to each I-block; and
    after said calculating, generating, by the processor, a residual error block for each I-block in frame B,
    wherein said categorizing comprises:
       categorizing, by the processor, as being an I-block an unconnected block in frame B having a residual interpolation error ($S_{RES}$) that is less than its minimum motion compensated error ($S_{MC-MIN}$); and
       categorizing, by the processor, as being a P-block an unconnected block in frame B having a residual interpolation error ($S_{RES}$) that is not less than its minimum motion compensated error ($S_{MC-MIN}$).

12. A system for processing a pair of successive video frames, each pair of frames consisting of frame A and frame B, said frames A and B each comprising blocks of pixels, said frame A being earlier in time than said frame B, said system comprising;
   means for determining a connection state of each pixel in frame B relative to the pixels of frame A, wherein said determining means eliminates multiple connections between the pixels in frame B and the pixels in frame A such that said connection state is a uni-connected state or an unconnected state;
   means for classifying each block in frame B as being either unconnected or uni-connected after said determining means determines said connection state;
   means for reclassifying uni-connected blocks in frame B as being unconnected for those uni-connected blocks in frame B satisfying a reclassification criteria;
   means for categorizing each unconnected block in frame B as a P-block or an I-block;
   means for calculating values for the pixels of each I-block in frame B by spatial interpolation based on values of nearest available neighbor pixels relative to each I-block; and
   means for generating a residual error block for each I-block in frame B.

13. The system of claim 12, further comprising:
   means for performing Motion Compensated Temporal Filtering (MCTF) on the pixels in frames A and B to generate a temporal low frame and a temporal high frame; and
   means for inserting the residual error block for each I-block in frame B into a corresponding block in the temporal high frame.

14. The system of claim 13, further comprising means for compressing the temporal high frame that includes the inserted the residual error block for each I-block in frame B.

15. The system of claim 12, said spatial interpolation being a linear spatial interpolation.

16. The system of claim 12, said spatial interpolation being a nonlinear spatial interpolation.

17. The system of claim 12, said spatial interpolation being a directional spatial interpolation.

18. The system of claim 12, said spatial interpolation being a non-directional spatial interpolation.

19. The system of claim 12, said spatial interpolation being a hybrid spatial interpolation.

20. A computer program product, comprising a computer usable medium having a computer readable program code embodied therein, said computer readable program code comprising an algorithm adapted to implement a method for processing video frames, said method comprising:
   providing a pair of successive video frames, each pair of frames consisting of frame A and frame B, said frames A and B each comprising blocks of pixels, said frame A being earlier in time than said frame B;
   determining a connection state of each pixel in frame B relative to the pixels of frame A, wherein said determining comprises eliminating multiple connections between the pixels in frame B and the pixels in frame A such that said connection state is a uni-connected state or an unconnected state;
   after said determining, classifying each block in frame B as being either unconnected or uni-connected;
   after said classifying, reclassifying uni-connected blocks in frame B as being unconnected for those uni-connected blocks in frame B satisfying a reclassification criteria;
   after said reclassifying, categorizing each unconnected block in frame B as a P-block or an I-block;
   after said categorizing, calculating values for the pixels of each I-block in frame B by spatial interpolation based on values of nearest available neighbor pixels relative to each I-block; and
   after said calculating, generating a residual error block for each I-block in frame B.

21. The computer program product of claim 20, said method further comprising:
   performing Motion Compensated Temporal Filtering (MCTF) on the pixels in frames A and B to generate a temporal low frame and a temporal high frame; and
   inserting the residual error block for each I-block in frame B into a corresponding block in the temporal high frame.

22. The computer program product of claim 21, said method further comprising after said inserting: compressing the temporal high frame.

23. The computer program product of claim 20, said spatial interpolation being a linear spatial interpolation.

24. The computer program product of claim 20, said spatial interpolation being a nonlinear spatial interpolation.

25. The computer program product of claim 20, said spatial interpolation being a directional spatial interpolation.

26. The computer program product of claim 20, said spatial interpolation being a non-directional spatial interpolation.

27. The computer program product of claim 20, said spatial interpolation being a hybrid spatial interpolation.

28. The computer program product of claim 20, said classifying comprising:
   classifying as being unconnected each block in frame B having at least a fraction F of its pixels in the unconnected state; and
   classifying as being uni-connected each block in frame B having less than the fraction F of its pixels in the unconnected state, said fraction F having a value in a range of 0.30 to 1.00.

29. A computer program product, comprising a computer usable medium having a computer readable program code embodied therein, said computer readable program code comprising an algorithm adapted to implement a method for processing video frames, said method comprising:
   providing a pair of successive video frames, each pair of frames consisting of frame A and frame B, said frames A and B each comprising blocks of pixels, said frame A being earlier in time than said frame B;
   determining a connection state of each pixel in frame B relative to the pixels of frame A, said connection state being a connected state or an unconnected state;
   classifying each block in frame B as being either unconnected or uni-connected;
   after said classifying, reclassifying uni-connected blocks in frame B as being unconnected for those uni-connected blocks in frame B satisfying a reclassification criteria;
   after said reclassifying, categorizing each unconnected block in frame B as a P-block or an I-block;
   after said categorizing, calculating values for the pixels of each I-block in frame B by spatial interpolation based on values of nearest available neighbor pixels relative to each I-block; and
   after said calculating, generating a residual error block for each I-block in frame B, wherein said reclassifying comprises:
   determining a matched block in frame A for each uni-connected block in frame B; and
   reclassifying a uni-connected block in frame B as being unconnected if the mean-squared displaced frame difference (DFD) between the uni-connected block in frame B and its matched block in frame A exceeds $fV_{MIN}$, said $V_{MIN}$ being the minimum of $V_1$ and $V_2$, said $V_1$ and $V_2$ being respectively the pixel variance of the uni-connected block in frame B and the pixel variance of its matched block in frame A, said f being in a range of 0.40 to 1.00.

30. A computer program product, comprising a computer usable medium having a computer readable program code embodied therein, said computer readable program code comprising an algorithm adapted to implement a method for processing video frames, said method comprising:
   providing a pair of successive video frames, each pair of frames consisting of frame A and frame B, said frames A and B each comprising blocks of pixels, said frame A being earlier in time than said frame B;
   determining a connection state of each pixel in frame B relative to the pixels of frame A, said connection state being a connected state or an unconnected state;
   classifying each block in frame B as being either unconnected or uni-connected;
   after said classifying, reclassifying uni-connected blocks in frame B as being unconnected for those uni-connected blocks in frame B satisfying a reclassification criteria;
   after said reclassifying, categorizing each unconnected block in frame B as a P-block or an I-block;
   after said categorizing, calculating values for the pixels of each I-block in frame B by spatial interpolation based on values of nearest available neighbor pixels relative to each I-block; and
   after said calculating, generating a residual error block for each I-block in frame B,
   wherein said categorizing comprises:
      categorizing as being an I-block an unconnected block in frame B having a residual interpolation error ($S_{RES}$) that is less than its minimum motion compensated error ($S_{MC-MIN}$); and
      categorizing as being a P-block an unconnected block in frame B having a residual interpolation error ($S_{RES}$) that is not less than its minimum motion compensated error ($S_{MC-MIN}$).

31. A computer system comprising a processor and a computer readable memory unit coupled to the processor, said memory unit containing instructions that when executed by the processor implement a method for processing video frames, said method comprising:
   providing a pair of successive video frames, each pair of frames consisting of frame A and frame B, said frames A and B each comprising blocks of pixels, said frame A being earlier in time than said frame B;
   determining a connection state of each pixel in frame B relative to the pixels of frame A, wherein said determining comprises eliminating multiple connections between the pixels in frame B and the pixels in frame A such that said connection state is a uni-connected state or an unconnected state;
   after said determining, classifying each block in frame B as being either unconnected or uni-connected;
   after said classifying, reclassifying uni-connected blocks in frame B as being unconnected for those uni-connected blocks in frame B satisfying a reclassification criteria;
   after said reclassifying, categorizing each unconnected block in frame B as a P-block or an I-block;
   after said categorizing, calculating values for the pixels of each I-block in frame B by spatial interpolation based on values of nearest available neighbor pixels relative to each I-block; and
   after said calculating, generating a residual error block for each I-block in frame B.

32. The computer system of claim 31, said method further comprising:
   performing Motion Compensated Temporal Filtering (MCTF) on the pixels in frames A and B to generate a temporal low frame and a temporal high frame; and
   inserting the residual error block for each I-block in frame B into a corresponding block in the temporal high frame.

33. The computer system of claim 32, said method further comprising after said inserting: compressing the temporal high frame.

34. The computer system of claim 31, said spatial interpolation being a linear spatial interpolation.

35. The computer system of claim 31, said spatial interpolation being a nonlinear spatial interpolation.

36. The computer system of claim 31, said spatial interpolation being a directional spatial interpolation.

37. The computer system of claim 31, said spatial interpolation being a non-directional spatial interpolation.

38. The computer system of claim 31, said spatial interpolation being a hybrid spatial interpolation.

39. The computer system of claim 31, said classifying comprising:
   classifying as being unconnected each block in frame B having at least a fraction F of its pixels in the unconnected state; and
   classifying as being uni-connected each block in frame B having less than the fraction F of its pixels in the unconnected state, said fraction F having a value in a range of 0.30 to 1.00.

40. A computer system comprising a processor and a computer readable memory unit coupled to the processor, said memory unit containing instructions that when executed by the processor implement a method for processing video frames, said method comprising:
   providing a pair of successive video frames, each pair of frames consisting of frame A and frame B, said frames A and B each comprising blocks of pixels, said frame A being earlier in time than said frame B;
   determining a connection state of each pixel in frame B relative to the pixels of frame A, said connection state being a connected state or an unconnected state;
   classifying each block in frame B as being either unconnected or uni-connected;
   after said classifying, reclassifying uni-connected blocks in frame B as being unconnected for those uni-connected blocks in frame B satisfying a reclassification criteria;
   after said reclassifying, categorizing each unconnected block in frame B as a P-block or an I-block;
   after said categorizing, calculating values for the pixels of each I-block in frame B by spatial interpolation based on values of nearest available neighbor pixels relative to each I-block; and
   after said calculating, generating a residual error block for each I-block in frame B, wherein said reclassifying comprises:
- determining a matched block in frame A for each uni-connected block in frame B; and
- reclassifying a uni-connected block in frame B as being unconnected if the mean-squared displaced frame difference (DFD) between the uni-connected block in frame B and its matched block in frame A exceeds $fV_{MIN}$, said $V_{MIN}$ being the minimum of $V_1$ and $V_2$, said $V_1$ and $V_2$ being respectively the pixel variance of the uni-connected block in frame B and the pixel variance of its matched block in frame A, said f being in a range of 0.40 to 1.00.

41. A computer system comprising a processor and a computer readable memory unit coupled to the processor, said memory unit containing instructions that when executed by the processor implement a method for processing video frames, said method comprising:
- providing a pair of successive video frames, each pair of frames consisting of frame A and frame B, said frames A and B each comprising blocks of pixels, said frame A being earlier in time than said frame B;
- determining a connection state of each pixel in frame B relative to the pixels of frame A, said connection state being a connected state or an unconnected state;
- classifying each block in frame B as being either unconnected or uni-connected:
- after said classifying, reclassifying uni-connected blocks in frame B as being unconnected for those uni-connected blocks in frame B satisfying a reclassification criteria;
- after said reclassifying, categorizing each unconnected block in frame B as a P-block or an I-block;
- after said categorizing, calculating values for the pixels of each I-block in frame B by spatial interpolation based on values of nearest available neighbor pixels relative to each I-block; and
- after said calculating, generating a residual error block for each I-block in frame B, wherein said categorizing comprises:
- categorizing as being an I-block an unconnected block in frame B having a residual interpolation error ($S_{RES}$) that is less than its minimum motion compensated error ($S_{MC-MIN}$); and
- categorizing as being a P-block an unconnected block in frame B having a residual interpolation error ($S_{RES}$) that is not less than its minimum motion compensated error ($S_{MC-MIN}$).

42. The method of claim 1, wherein the classifying is based on a number of pixels in each block that are in the unconnected state.

43. The method of claim 1, wherein, in the determining step, each pixel in frame B which is in the connected state is connected to exactly one pixel in frame A.

* * * * *